US012699250B2

(12) United States Patent
Morikuni et al.

(10) Patent No.: US 12,699,250 B2
(45) Date of Patent: Aug. 4, 2026

(54) RELAY SYSTEM AND PROJECTOR

(71) Applicant: SEIKO EPSON CORPORATION, Tokyo (JP)

(72) Inventors: Eiji Morikuni, Matsumoto (JP); Kana Hatano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 298 days.

(21) Appl. No.: 18/586,811

(22) Filed: Feb. 26, 2024

(65) Prior Publication Data

US 2024/0288662 A1 Aug. 29, 2024

(30) Foreign Application Priority Data

Feb. 27, 2023 (JP) ................................. 2023-028140

(51) Int. Cl.
| | |
|---|---|
| *G02B 9/26* | (2006.01) |
| *G02B 13/16* | (2006.01) |
| *G02B 13/18* | (2006.01) |
| *G03B 21/20* | (2006.01) |

(52) U.S. Cl.
CPC .............. *G02B 9/26* (2013.01); *G02B 13/16* (2013.01); *G02B 13/18* (2013.01); *G03B 21/2066* (2013.01)

(58) Field of Classification Search
CPC ... G02B 9/00; G02B 9/06; G02B 9/12; G02B 9/14; G02B 9/24; G02B 9/26; G02B 9/36; G02B 13/00; G02B 13/0015; G02B 13/0045; G02B 13/0065; G02B 13/0095; G02B 13/02; G02B 13/12; G02B 13/18
See application file for complete search history.

(56) References Cited

U.S. PATENT DOCUMENTS

| | | | |
|---|---|---|---|
| 7,159,988 B2 | 1/2007 | Yatsu et al. | |
| 7,911,716 B1* | 3/2011 | Lu | G02B 9/14 |
| | | | 359/651 |
| 2015/0222863 A1* | 8/2015 | Kawakami | H04N 9/3126 |
| | | | 353/30 |
| 2017/0351070 A1* | 12/2017 | Shiokawa | G02B 13/22 |
| 2019/0025680 A1* | 1/2019 | Hirata | G02B 17/08 |

(Continued)

FOREIGN PATENT DOCUMENTS

| | | |
|---|---|---|
| JP | 2005-157153 A | 6/2005 |
| JP | 2005-345767 A | 12/2005 |

(Continued)

*Primary Examiner* — Sultan Chowdhury
(74) *Attorney, Agent, or Firm* — Oliff PLC

(57) ABSTRACT

A relay system includes a first lens group formed of a plurality of lenses and having positive power, a second lens group including a diaphragm and at least one negative lens and having negative power, and a third lens group formed of a plurality of lenses and having positive power. The number of lenses of the first lens group and the number of lenses of the third lens group are equal to each other. The arrangement of the lens power of the plurality of lenses of the first lens group, which are arranged from the enlargement side toward the reduction side, is the same as the arrangement of the lens power of the plurality of lenses of the third lens group, which are arranged from the reduction side toward the enlargement side. The enlargement-side and reduction-side portions of the relay system are telecentric portions.

10 Claims, 9 Drawing Sheets

(56) References Cited

U.S. PATENT DOCUMENTS

| | | | |
|---|---|---|---|
| 2019/0094504 A1* | 3/2019 | Nagatoshi | G02B 13/04 |
| 2023/0074488 A1 | 3/2023 | Wakabayashi | |
| 2023/0314763 A1* | 10/2023 | Hirano | G02B 13/16 |
| | | | 359/794 |

FOREIGN PATENT DOCUMENTS

| JP | 2006-330410 A | 12/2006 |
|---|---|---|
| JP | 2022-038106 A | 3/2022 |
| JP | 2023-037782 A | 3/2023 |

* cited by examiner

RELAY SYSTEM AND PROJECTOR

The present application is based on, and claims priority from JP Application Serial Number 2023-028140, filed Feb. 27, 2023, the disclosure of which is hereby incorporated by reference herein in its entirety.

BACKGROUND

1. Technical Field

The present disclosure relates to a relay system and a projector.

2. Related Art

JP-A-2006-330410 describes an optical system that couples the enlargement-side image formation plane to the reduction-side image formation plane, which is a demagnified enlargement-side image formation plane. The first projection optical unit in JP-A-2006-330410 is an optical system that has telecentric portions at opposite sides and couples the primary image formation plane to the object plane, which is a reduced primary image formation plane. The first projection optical unit includes a first lens group having positive power, a second lens group having negative power, and a third lens group having positive power. The first lens group is formed of four lenses. The second lens group is formed of an aperture stop and five lenses. The third lens group is formed of three lenses.

JP-A-2006-330410 is an example of the related art.

In the optical system described in JP-A-2006-330410, an attempt to improve the optical characteristics thereof causes a problem of an increase in the overall length of the lens portion.

SUMMARY

To solve the problem described above, a relay system according to an aspect of the present disclosure is a relay system that couples an enlargement-side image formation plane to a reduction-side image formation plane that is a reduced version of the enlargement-side image formation plane, the relay system including a first lens group formed of a plurality of lenses and having positive power, a second lens group including a diaphragm and at least one negative lens and having negative power, and a third lens group formed of a plurality of lenses and having positive power, the three lens groups sequentially arranged in a direction in which beams travel from the enlargement side toward the reduction side. The number of lenses of the first lens group and the number of lenses of the third lens group are equal to each other. An arrangement of lens power of the plurality of lenses of the first lens group, which are arranged from the enlargement side toward the reduction side, is the same as an arrangement of lens power of the plurality of lenses of the third lens group, which are arranged from the reduction side toward the enlargement. Enlargement-side and reduction-side portions of the relay system are telecentric portions.

A projector according to another aspect of the present disclosure is a projector including the relay system described above, the projector including a light source, a color separation system that separates white light output from the light source into first color light having a first wavelength band containing blue light and other color light having a wavelength band longer than the first wavelength band, a first light modulator that modulates the first color light separated by the color separation system, a second light modulator that modulates the other color light separated by the color separation system, the relay system, in which the first light modulator is disposed at the enlargement-side image formation plane and which reduces a luminous flux width of the first color light modulated by the first light modulator to a size of the reduction-side image formation plane, a light combining prism that combines the first color light the luminous flux width of which is reduced by the relay system and the other color light modulated by the second light modulator with each other into combined light and outputs the combined light, and a projection system that projects the combined light output from the light combining prism. An effective area of the first light modulator is larger than an effective area of the second light modulator. The relay system includes a first planar mirror disposed between the enlargement-side image formation plane and the first lens group, and a second planar mirror disposed between the third lens group and the reduction-side image formation plane. The first and second planar mirrors each deflect the beams. An optical axis of the enlargement-side image formation plane and an optical axis of the reduction-side image formation plane are parallel to each other. A direction in which the first color light is incident on the enlargement-side image formation plane is opposite a direction in which the first color light exits via the reduction-side image formation plane.

A projector according to another aspect of the present disclosure is a projector including the relay system described above, the projector including a light source, a color separation system that separates white light output from the light source into first color light having a first wavelength band containing blue light and other color light having a wavelength band longer than the first wavelength band, a first light modulator that modulates the first color light separated by the color separation system, a second light modulator that modulates the other color light separated by the color separation system, the relay system, in which the first light modulator is disposed at the enlargement-side image formation plane and which reduces a luminous flux width of the first color light modulated by the first light modulator to a size of the reduction-side image formation plane, a light combining prism that combines the first color light the luminous flux width of which is reduced by the relay system and the other color light modulated by the second light modulator with each other into combined light and outputs the combined light, and a projection system that projects the combined light output from the light combining prism. An effective area of the first light modulator is larger than an effective area of the second light modulator. The relay system includes a first planar mirror disposed between the enlargement-side image formation plane and the first lens group, and a second planar mirror disposed in the first lens group. The first and second planar mirrors each deflect the beams. An optical axis of the enlargement-side image formation plane and an optical axis of the reduction-side image formation plane are parallel to each other. A direction in which the first color light is incident on the enlargement-side image formation plane is opposite a direction in which the first color light exits via the reduction-side image formation plane.

DESCRIPTION OF EMBODIMENTS

A relay system and a projector according to embodiments of the present disclosure will be described below with reference to the drawings.

First Embodiment

Figure 1:
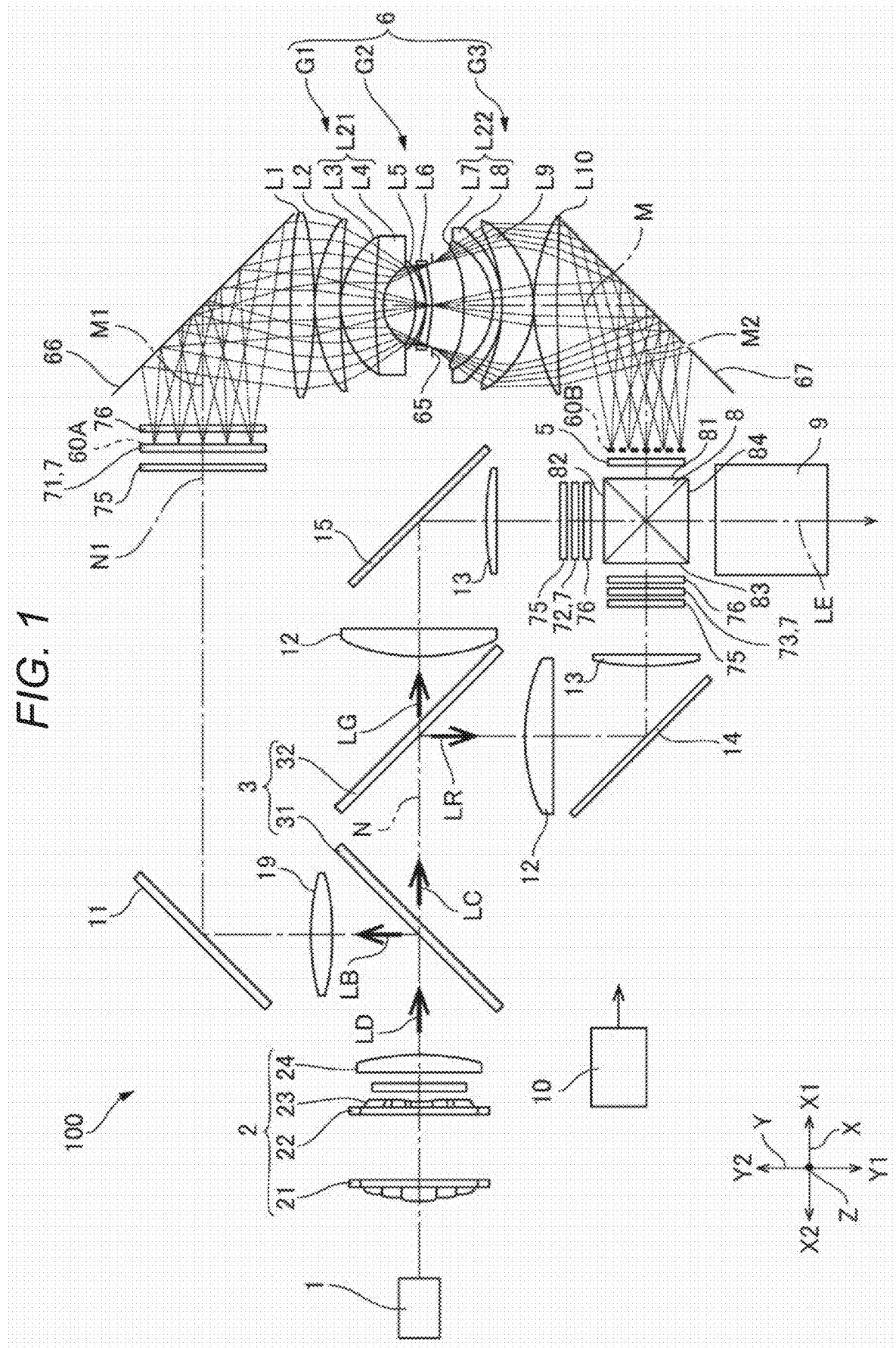
FIG. 1 is a schematic view of key parts of a projector using a relay system according to a first embodiment.

FIG. 1 is a schematic view of key parts of a projector 100 using a relay system 6 according to a first embodiment. The projector 100 includes a light source 1, an illumination system 2, which homogenizes the light output from the light source 1, a color separation system 3, which separates the light output from the illumination system 2 into a variety of types of color light, a plurality of light modulators 7, which modulate the plurality of types of color light separated by the color separation system 3 to form projection images, a reflection mirror 11, a relay system 6, which reduces the luminous flux width of the color light modulated by one of the plurality of light modulators 7, a light combining prism 8, which combines the plurality of types of color light modulated by the light modulators 7 with one another into combined light and outputs the combined light, a projection system 9, which projects the combined light output from the light combining prism 8, and a controller 10, which controls the light modulators 7, as shown in FIG. 1.

In the following description, three axes perpendicular to one another are called an X-axis, a Y-axis, and a Z-axis for convenience. The direction along a first optical axis N of the color separation system 3 is called an X-axis direction. In the X-axis direction, the direction in which the light output from the illumination system 2 travels is called a first direction X1, and the opposite direction of the first direction X1 is called a second direction X2. In the Y-axis direction, the direction in which the combined light exits out of the light combining prism 8 is called a third direction Y1, and the opposite direction of the third direction Y1 is called a fourth direction Y2.

The light source 1 is formed, for example, of an ultrahigh-pressure mercury lamp or a solid-state light source. In the present embodiment, the light source 1 outputs white light as output light LD.

The illumination system 2 includes a multi-lens 21, a polarizing beam splitter 22, a multi-lens 23, and a relay lens 24. The multi-lens 21 divides the output light LD from the light source 1 into a plurality of luminous fluxes. The polarizing beam splitter 22 converts the polarization direction of the output light LD output from the multi-lens 21. The multi-lens 23 brings the output light LD output from the polarizing beam splitter 22 into focus in the vicinity of the relay lens 24. The relay lens 24 enlarges the output light LD incident from the multi-lens 23 and directs the enlarged output light LD toward the color separation system 3.

The color separation system 3 includes a first dichroic mirror 31 and a second dichroic mirror 32 sequentially arranged in the first direction X1. The first dichroic mirror 31 and the second dichroic mirror 32 are arranged along the first optical axis N of the color separation system 3. The optical axis of the output light LD from the illumination system 2 coincides with the first optical axis N.

The first dichroic mirror 31 separates the output light LD into first color light LB and other color light LC The first dichroic mirror 31 reflects the first color light LB in the fourth direction Y2 and transmits the other color light LC in the first direction X1. The second dichroic mirror 32 separates the other color light LC into second color light LG and third color light LR. The second dichroic mirror 32 reflects the third color light LR in the third direction Y1 and transmits the second color light LG in the first direction X1. In the present embodiment, the first color light LB has a first wavelength band containing blue light. The second color light LG has a second wavelength band containing green light. The third color light LR has a third wavelength band containing red light. The first wavelength band ranges, for example, from 420 to 500 nm. The second wavelength band ranges, for example, from 500 to 600 nm. The third wavelength band ranges, for example, from 600 to 680 nm. The wavelength band of the other color light LC ranges, for example, from 500 to 680 nm.

A reflection mirror 14, which reflects in the first direction X1 the third color light LR separated by the second dichroic mirror 32, is disposed at a position shifted from the second dichroic mirror 32 in the third direction Y1. A reflection mirror 15, which reflects in the third direction Y1 the second color light LG separated by the second dichroic mirror 32, is disposed at a position shifted from the second dichroic mirror 32 in the first direction X1. A lens 12 is disposed between the second dichroic mirror 32 and the reflection mirror 14, and another lens 12 is disposed between the second dichroic mirror 32 and the reflection mirror 15. A lens 13 is disposed at a position shifted from the reflection mirror 14 in the first direction X1, and another lens 13 is disposed at a position shifted from the reflection mirror 15 in the third direction Y1. The lenses 12 and 13 bring the second color light LG and the third color light LR separated by the color separation system 3 into focus in the vicinity of the corresponding light modulators 7.

The reflection mirror 11 is disposed at a position shifted from the first dichroic mirror 31 in the fourth direction Y2. The reflection mirror 11 reflects in the first direction X1 the first color light LB separated by the first dichroic mirror 31. The projector 100 includes a relay lens 19 between the reflection mirror 11 and the first dichroic mirror 31. The relay lens 19 adjusts the position where the first color light LB from the first dichroic mirror 31 is brought into focus in such a way that the first light modulator 71 is uniformly irradiated with the first color light LB. In the present embodiment, the relay lens 19 is formed of a single lens. Note that the relay lens 19 may be formed of a plurality of lenses.

The light modulators 7 are each a liquid crystal panel. The light modulators 7 include the first light modulator 71, which modulates the first color light LB, a third light modulator 72, which modulates the second color light LG, and a fourth light modulator 73, which modulates the third color light LR. The first light modulator 71, the third light modulator 72, and the fourth light modulator 73 each include a lightincident-side polarizer 75 and a light-exiting-side polarizer 76. The third light modulator 72 and the fourth light modulator 73 correspond to the "second light modulator" in the present disclosure.

The first light modulator 71 is disposed at a position shifted from the first dichroic mirror 31 in the first direction X1. An optical axis N1 of the first light modulator 71 extends in the direction along the X-axis. The optical axis N1 of the first light modulator 71 is parallel to the first optical axis N of the color separation system 3.

The third light modulator 72 is disposed at a position where the third light modulator 72 faces a second surface 82 of the light combining prism 8. The fourth light modulator 73 is disposed at a position where the fourth light modulator 73 faces a third surface 83 of the light combining prism 8.

The effective area of the first light modulator 71 is larger than those of the third light modulator 72 and the fourth light modulator 73. The effective area used herein represents the area of the effective display region of each of the light modulators. In the present embodiment, the first light modulator 71 is a liquid crystal panel having an effective display region the diagonal dimension of which is 1.03 inches, and the third light modulator 72 and the fourth light modulator 73 are each a liquid crystal panel having an effective display region the diagonal dimension of which is 0.67 inches.

The relay system 6 couples an enlargement-side image formation plane 60A to a reduction-side image formation plane 60B, which is a reduced enlargement-side image formation plane 60A. The first light modulator 71 is disposed at the enlargement-side image formation plane 60A, and the relay system 6 reduces the luminous flux width of the first color light LB modulated by the first light modulator 71 to the size of the reduction-side image formation plane 60B. That is, the relay system 6 is a demagnifying optical system. In the present embodiment, the relay system 6 reduces the 1.03-inch luminous flux width of the first color light LB modulated by the first light modulator 71 to a 0.67-inch luminous flux width at the reduction-side image formation plane 60B. The optical axis N1 of the first light modulator 71 coincides with an optical axis M1 of the enlargement-side image formation plane 60A. The reduction-side image formation plane 60B is set at a position where the reduction-side image formation plane 60B faces a first surface 81 of the light combining prism 8. The air-equivalent distance between the reduction-side image formation plane 60B and the first surface 81 of the light combining prism 8 is equal to the air-equivalent distance between the third light modulator 72 and the second surface 82 of the light combining prism 8. The air-equivalent distance between the reduction-side image formation plane 60B and the first surface 81 of the light combining prism 8 is equal to the air-equivalent distance between the fourth light modulator 73 and the third surface 83 of the light combining prism 8.

The projector 100 includes a polarizer 5 disposed between the reduction-side image formation surface 60B and the first surface 81. The polarizer 5 and the polarizer 76 at the light exiting side of the first light modulator 71 transmit a component linearly polarized in a single direction out of the polarized light components contained in the first color light LB. That is, when the polarizer 76 at the light exiting side of the first light modulator 71 transmits the S-polarized light of the first color light LB, the polarizer 5 transmits the S-polarized light, and when the polarizer 76 at the light exiting side of the first light modulator 71 transmits the P-polarized light of the first color light LB, the polarizer 5 transmits the P-polarized light.

The light combining prism 8 has the first surface 81, on which the first color light LB is incident, the second surface 82, on which the second color light LG is incident, the third surface 83, on which the third color light LR is incident, and a fourth surface 84, via which combined light LE exits. The first surface 81 and the third surface 83 face each other in the X-axis direction. The second surface 82 and the fourth surface 84 face each other in the Y-axis direction. The light combining prism 8 combines the first color light LB the luminous flux width of which has been reduced by the relay system 6, the second color light LG modulated by the third light modulator 72, and the third color light LR modulated by the fourth light modulator 73 with one another into the combined light LE and outputs the combined light LE via the fourth surface 84 in the third direction Y1. The luminous flux width of the first color light LB incident on the first surface 81 of the light combining prism 8 is equal to those of the second color light LG incident on the second surface 82 of the light combining prism 8 and the third color light LR incident on the third surface 83 of the light combining prism 8.

The projection system 9 projects the combined light LE output from the light combining prism 8 onto a screen. The projection system 9 includes a plurality of lenses. The controller 10 operates the light modulators 7 based on an external image signal such as a video signal.

Details of Relay System

The relay system 6 includes a first lens group G1 formed of a plurality of lenses and having positive power, a second lens group G2 including a diaphragm 65 and at least one negative lens and having negative power, and a third lens group G3 formed of a plurality of lenses and having positive power, the three lens groups sequentially arranged in the direction in which the beams travel from the enlargement side toward the reduction side, as shown in FIG. 1. The first lens group G1, the second lens group G2, and the third lens group G3 are arranged along a second optical axis M of the relay system 6.

The first lens group G1 is formed of four lenses L1 to L4. The lenses L1 to L4 are arranged in this order from the enlargement side toward the reduction side. The lens L1 has positive power. The lens L1 has convex surfaces at the enlargement and reduction sides. The lens L2 has positive power. The lens L2 has a convex surface at the enlargement side and a concave surface at the reduction side. The lens L3 has positive power. The lens L3 has a convex surface at the enlargement side and a concave surface at the reduction side. The lens L4 has negative power. The lens L4 has a convex surface at the enlargement side and a concave surface at the reduction side. The lens L3 and the lens L4 are bonded to each other into a cemented doublet L21.

The second lens group G2 is formed of two lenses L5 and L6 and the diaphragm 65. The lenses L5 and L6 and the diaphragm 65 are arranged in this order from the enlargement side toward the reduction side. The lens L5 has positive power. The lens L5 has a concave surface at the enlargement side and a convex surface at the reduction side. The lens L5 has aspheric surfaces at the enlargement and reduction sides. The lens L6 (negative lens) has negative power. The lens L6 has a concave surface at the enlargement side and a convex surface at the reduction side. The lens L6 has aspheric surfaces at the enlargement and reduction sides. Out of the lenses of the first lens group G1, the second lens group G2, and the third lens group G3, the lens L6 has the smallest effective radius.

The third lens group G3 is formed of four lenses L7 to L10. The lenses L7 to L10 are arranged in this order from the enlargement side toward the reduction side. The lens L7 has negative power. The lens L7 has a concave surface at the enlargement side and a convex surface at the reduction side. The lens L8 has positive power. The lens L8 has a concave surface at the enlargement side and a convex surface at the reduction side. The lens L9 has positive power. The lens L9 has a concave surface at the enlargement side and a convex surface at the reduction side. The lens L10 has positive power. The lens L10 has a convex surface at the enlargement side and a concave surface at the reduction side. The lens L7 and the lens L8 are bonded to each other into a cemented doublet L22.

The number of lenses of the first lens group G1 and the number of lenses of the third lens group G3 are equal to each other or four. The arrangement of the lens power of the lenses L1 to L4 of the first lens group G1, which are arranged from the enlargement side toward the reduction side, is the same as the arrangement of the lens power of the lenses L10 to L7 of the third lens group G3, which are arranged from the reduction side toward the enlargement side. Specifically, the arrangement of the lens power of the lenses L1 to L4 of the first lens group G1 is positive, positive, positive, and negative sequentially from the enlargement side toward the reduction side. The arrangement of the lens power of the lenses L10 to L7 of the third lens group G3 is positive, positive, positive, and negative sequentially from the reduction side toward the enlargement side.

The relay system 6 includes a first planar mirror 66 disposed between the enlargement-side image formation plane 60A and the first lens group G1, and a second planar mirror 67 disposed between the third lens group G3 and the reduction-side image formation plane 60B. The first planar mirror 66 has a planar shape. The first planar mirror 66 is disposed at a position shifted from the first lens group G1 in the fourth direction Y2. The second planar mirror 67 has a planar shape. The second planar mirror 67 is disposed at a position shifted from the third lens group G3 in the third direction Y1. The first planar mirror 66 and the second planar mirror 67 each deflect the beams by 90°.

The first color light LB modulated by the first light modulator 71 travels in the first direction X1. The first color light LB having reached the first planar mirror 66 from the first light modulator 71 is reflected off the first planar mirror 66 in the third direction Y1. The first color light LB reflected off the first planar mirror 66 passes through the first lens group G1, the second lens group G2, and the third lens group G3 and reaches the second planar mirror 67. The first color light LB having reached the second planar mirror 67 is reflected off the second planar mirror 67 in the second direction X2. The first color light LB reflected off the second planar mirror 67 reaches the reduction-side image formation plane 60B.

The optical axis M1 of the enlargement-side image formation plane 60A and an optical axis M2 of the reduction-side image formation plane 60B are parallel to each other.

The direction in which the first color light LB is incident on the enlargement-side image formation plane 60A is the first direction X1. The direction in which the first color light LB exits via the reduction-side image formation plane 60B is the second direction X2. That is, the direction in which the first color light LB is incident on the enlargement-side image formation plane 60A is opposite the direction in which the first color light LB exits via the reduction-side image formation plane 60B.

The enlargement-side image formation plane 60A and the reduction-side image formation plane 60B are located at positions shifted in the first direction X1 from the first surface 81 of the light combining prism 8 or at the same side thereof. That is, the first light modulator 71 and the reduction-side image formation plane 60B are located at positions shifted in the first direction X1 from the first surface 81 of the light combining prism 8 or at the same side thereof.

The enlargement-side and reduction-side portions of the relay system 6 are telecentric portions. The state in which the enlargement-side portion of the relay system 6 is a telecentric portion means that the central beam of each luminous flux traveling between the first lens group G1 and the enlargement-side image formation plane 60A is parallel or substantially parallel to the optical axis M1. The state in which the reduction-side portion of the relay system 6 is a telecentric portion means that the central beam of each luminous flux traveling between the third lens group G3 and the reduction-side image formation plane 60B is parallel or substantially parallel to the optical axis M2. In the present embodiment, the angle between the central beam of each luminous flux and the optical axes M1 and M2 is smaller than or equal to ±5.2°.

Data on the relay system 6 are listed in the table below. In the table, Yb represents the largest image height at the reduction-side image formation plane 60B of the relay system 6, TL represents the overall length of the relay system 6, LA represents the length of the lens portion of the relay system 6, Fn represents the reduction-side f-number of the relay system 6, and E represents the magnification of the relay system 6.

Yb 8.499 mm
TL 149.613 mm
LA 58.000 mm
Fn 1.56
E 1.53

Data on the lenses of the relay system 6 are listed below. The surfaces of the lenses are numbered sequentially from the enlargement side toward the reduction side. Reference characters are given to the enlargement-side image formation plane, the first planar mirror, the lenses, the second planar mirror, and the reduction-side image formation plane. A surface number preceded by "*" indicates that the surface of the lens is an aspheric surface. R represents the radius of curvature. D represents the axial inter-surface spacing. Y represents the effective radius. R, D, and Y are each expressed in millimeters.

| Reference character | Surface number | R | D | Glass material | Refraction/Reflection | Y |
|---|---|---|---|---|---|---|
| 60A | 0 | 0.00000 | 31.580246 | | Refraction | 13.0186 |
| 66 | 1 | 0.00000 | −19.000000 | | Reflection | 26.3350 |
| L1 | 2 | −162.37680 | −5.201359 | FDS90_HOYA | Refraction | 19.1260 |
| | 3 | 84.32601 | −0.100000 | | Refraction | 19.1500 |
| L2 | 4 | −35.44181 | −5.352889 | TAFD5F_HOYA | Refraction | 17.8110 |
| | 5 | −116.32346 | −0.100000 | | Refraction | 17.1550 |

-continued

| | | | | | | |
|---|---|---|---|---|---|---|
| L3 | 6 | −19.11042 | −7.518746 | LAC14_HOYA | Refraction | 14.2080 |
| L4 | 7 | 124.60481 | −1.700000 | FDS90_HOYA | Refraction | 12.7950 |
| | 8 | −10.75908 | −7.171088 | | Refraction | 8.8980 |
| L5 | *9 | 14.30563 | −2.069460 | MFCD1_HOYA | Refraction | 8.8520 |
| | *10 | 12.99599 | −0.600000 | | Refraction | 8.9860 |
| L6 | *11 | 11.66571 | −0.839981 | MCFDS91050_HOYA | Refraction | 8.5710 |
| | *12 | 18.19224 | −0.100000 | | Refraction | 8.8900 |
| 65 | 13 | 0.00000 | −6.930074 | | Refraction | 9.1000 |
| L7 | 14 | 28.86896 | −6.473631 | TAC8_HOYA | Refraction | 12.5060 |
| L8 | 15 | 16.10000 | −1.700000 | FDS90_HOYA | Refraction | 13.6680 |
| | 16 | 22.67072 | −0.100000 | | Refraction | 15.7660 |
| L9 | 17 | 35.65690 | −6.961152 | TAC8_HOYA | Refraction | 16.9490 |
| | 18 | 21.45000 | −0.100000 | | Refraction | 17.8570 |
| L10 | 19 | −43.75576 | −4.981621 | TAC8_HOYA | Refraction | 18.2240 |
| | 20 | −236.70294 | −19.532922 | | Refraction | 17.9300 |
| 67 | 21 | 0.00000 | 21.500000 | | Reflection | 24.6370 |
| 60B | 22 | 0.00000 | 0.000000 | | Refraction | 8.4990 |

| | Surface number | | | |
|---|---|---|---|---|
| | 9 | 10 | 11 | 12 |
| Conic constant | 5.053678E−03 | −2.860697E+00 | −3.230191E−01 | −6.97551E+00 |
| Fourth-order coefficient | −3.06104E−04 | −1.7453E−04 | −3.34083E−04 | −1.53851E−04 |
| Sixth-order coefficient | 2.5211E−06 | 4.6784E−06 | 3.1088E−06 | −8.54971E−08 |
| Eighth-order coefficient | −1.24701E−08 | −2.93731E−08 | −1.56141E−08 | 9.73958E−09 |
| Tenth-order coefficient | 9.8277E−11 | 1.02513E−10 | 5.06999E−11 | −4.04748E−11 |

When the largest image height at the enlargement-side image formation plane 60A and the reduction-side image formation plane 60B is set at 1, the angle of the center beam of each luminous flux at the enlargement-side image formation plane 60A with respect to the optical axis M1, and the angle of the center beam of each luminous flux at the reduction-side image formation plane 60B with respect to the optical axis M2 are listed below.

| Image height | Enlargement-side image formation plane | Reduction-side image formation plane |
|---|---|---|
| 1 | 4.754 | 5.198 |
| 0.9 | 4.419 | 4.722 |
| 0.85 | 4.225 | 4.481 |
| 0.75 | 3.803 | 3.989 |
| 0.5 | 2.619 | 2.706 |
| 0 | 0.000 | 0.000 |

The relay system 6 according to the present embodiment satisfies the conditional expressions below, $$D1 < L1 \quad (1)$$

$$D2 < L2 \quad (2)$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

In the present embodiment, the largest air spacing L1 is provided between the enlargement-side image formation plane 60A and the lens L1. The effective diameter D1 is the effective diameter of the enlargement-side image formation plane 60A adjacent to the largest air spacing L1. The second-largest air spacing L2 is provided between the lens L10 and the reduction-side image formation plane 60B. The effective diameter D2 is the effective diameter of the reduction-side image formation plane 60B adjacent to the second-largest air spacing L2. Specific numerical values of the parameters described above are listed below.

D1 26.0372 mm
L1 50.5802 mm
D2 16.998 mm
L2 41.0329 mm

The relay system 6 according to the present embodiment therefore satisfies Conditional Expressions (1) and (2).

Effects and Advantages

The relay system 6 according to the present embodiment couples the enlargement-side image formation plane 60A to the reduction-side image formation plane 60B, which is a reduced enlargement-side image formation plane 60A. The relay system 6 includes the first lens group G1 formed of the plurality of lenses and having positive power, the second lens group G2 including the diaphragm 65 and the lenses L5 and L6, and having negative power, and the third lens group G3 formed of the plurality of lenses and having positive power. The number of lenses of the first lens group G1 and the number of lenses of the third lens group G3 are equal to each other or four. The arrangement of the lens power of the lenses L1 to L4 of the first lens group G1, which are arranged from the enlargement side toward the reduction side, is the same as the arrangement of the lens power of the lenses L10 to L7 of the third lens group G3, which are arranged from the reduction side toward the enlargement side, that is, the arrangements are both positive, positive, positive, and negative. The enlargement side of the first lens group G1 and the reduction side of the third lens group G3 are telecentric portions.

In the present embodiment, the lens configuration of the first lens group G1, the lenses of which are arranged from the enlargement side toward the reduction side, and the lens configuration of the third lens group G3, the lenses of which are arranged from the reduction side toward the enlargement side, are symmetrical with respect to the boundary thereof, so that a variety of aberrations produced by the first lens group G1 can be cancelled out by the variety of aberrations produced by the third lens group G3. The optical performance of the relay system 6 can therefore be improved.

Since the portions of the relay system 6 according to the present embodiment at opposite sides are telecentric portions, the relay system 6 is incorporated in the projector 100 with less accuracy and is more readily positioned than in a case where the portions of the relay system 6 at opposite sides are not telecentric portions.

In the present embodiment, the first lens group G1 includes the two positive lenses L1 and L2 and the cemented doublet L21 sequentially arranged from the enlargement side toward the reduction side, and the third lens group G3 includes the two positive lenses L10 and L9 and the cemented doublet L22 sequentially arranged from the reduction side toward the enlargement side. Since the first lens group G1 and the third lens group G3 each have a cemented doublet, the chromatic aberration of magnification produced by the first lens group G1 is satisfactorily cancelled out by the third lens group G3. Furthermore, since the first lens group G1 and the third lens group G3 each include two positive lenses, the overall length of the relay system 6 can be reduced.

In the present embodiment, out of the lenses of the first lens group G1, the second lens group G2, and the third lens group G3, the lens L6 having the smallest effective radius has aspheric surfaces. The lens L6 is adjacent to the diaphragm 65, and all beams are divergent when passing through the lens L6. The lens L6 having aspheric surfaces can therefore satisfactorily remove the variety of aberrations at all image heights, so that the optical performance of the relay system 6 can be improved.

The relay system 6 satisfies the conditional expressions below, $$D1 < L1 \tag{1}$$

$$D2 < L2 \tag{2}$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

In the present embodiment, the relay system 6, which satisfies Conditional Expressions (1) and (2), readily allows the angle of the optical path to be changed to any value at the largest air spacing L1 and the second-largest air spacing L2. The relay system 6 is thus laid out with improved flexibility. Since the largest air spacing L1 is greater than the effective diameter D1 of the enlargement-side image formation plane 60A, the beams are readily controlled without a large angle of refraction at the lens L1 adjacent to the largest air spacing L1. Since the second-largest air spacing L2 is greater than the effective diameter D2 of the reduction-side image formation plane 60B, the beams are readily controlled without a large angle of refraction at the lens L10 adjacent to the second-largest air spacing L2.

The relay system 6 according to the present embodiment includes the first planar mirror 66 disposed at the largest air spacing, and the second planar mirror 67 disposed at the second-largest air spacing. The largest air spacing is provided between the enlargement-side image formation plane 60A and the first lens group G1. The second-largest air spacing is provided between the third lens group G3 and the reduction-side image formation plane 60B. The first planar mirror 66 and the second planar mirror 67 are therefore readily disposed in the relay system 6.

In the present embodiment, the first planar mirror 66 and the second planar mirror 67 each deflect the beams. The optical axis M1 of the enlargement-side image formation plane 60A and the optical axis M2 of the reduction-side image formation plane 60B are parallel to each other. The direction in which the beams are incident on the enlargement-side image formation plane 60A is opposite the direction in which the beams are incident on the reduction-side image formation plane 60B. The relay system 6 can therefore efficiently deflect the optical path by 180°.

The projector 100 according to the present embodiment includes the light source 1, the color separation system 3, which separates the output light LD output from the light source 1 into the first color light LB having the first wavelength band containing blue light and the other color light having a wavelength band longer than that of the first color light LB, the first light modulator 71, which modulates the first color light LB separated by the color separation system 3, a second light modulator that modulates the other color light separated by the color separation system 3, the relay system 6, in which the first light modulator 71 is disposed at the enlargement-side image formation plane 60A and the luminous flux width of the first color light LB modulated by the first light modulator 71 is reduced to the size of the reduction-side image formation plane 60B, the light combining prism 8, which combines the first color light LB the luminous flux width of which has been reduced by the relay system 6 and the other color light modulated by the second light modulator with each other into the combined light LE and outputs the combined light LE, and the projection system 9, which projects the combined light LE output from the light combining prism 8. The effective area of the first light modulator 71 is larger than that of the second light modulator. The optical axis N1 of the first light modulator 71 is parallel to the optical axis M1 of the enlargement-side image formation plane 60A.

According to the present embodiment, the projector 100 uses the relay system 6 according to the present embodiment, so that the projector 100 provided by the present embodiment has improved optical performance.

According to the present embodiment, the effective area of the first light modulator 71 is larger than that of the second light modulator, so that the illuminance at the first light modulator 71 can be lower than that at the second light modulator. Degradation of the liquid crystal material of the first light modulator 71 due to the light from the light source 1 can thus be suppressed even when the luminance of the light from the light source 1 is increased.

The relay system 6 can reduce the luminous flux width of the first color light LB modulated by the first light modulator 71 to the size of the reduction-side image formation plane 60B and therefore allows the luminous flux widths of the variety of types of color light that enter the light combining prism 8 to be equal to one another even when the effective area of the first light modulator 71 is larger than that of the third light modulator 72.

The relay system 6, in which the first color light LB incident on the enlargement-side image formation plane 60A is deflected by 180° and exits via the reduction-side image formation plane 60B, allows reduction in overall size of the projector as compared with a case where the relay system 6 does not deflect the first color light LB.

Figure 2:
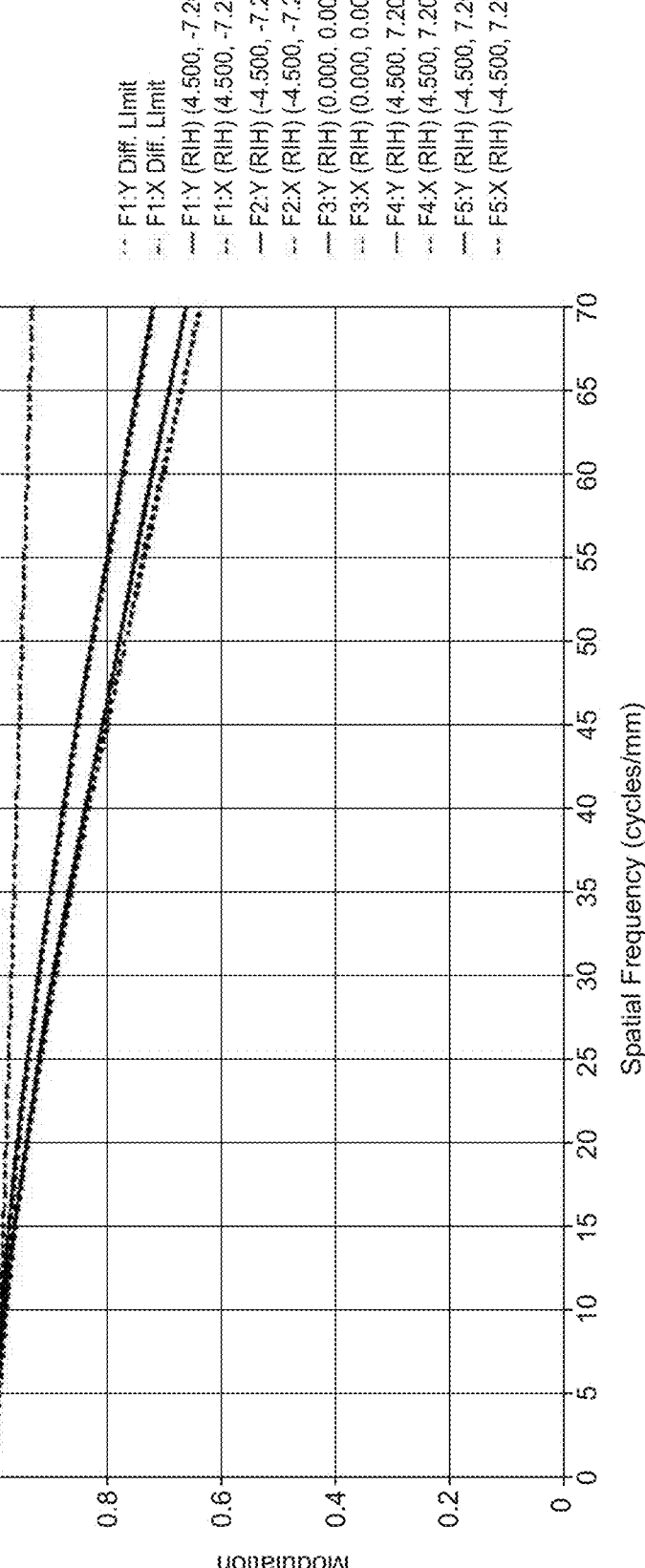
FIG. 2 shows the reduction-side MTF of the relay system according to the first embodiment.

FIG. 2 shows the reduction-side MTF of the relay system 6 according to the first embodiment. In FIG. 2, the horizontal axis represents the spatial frequency, and the vertical axis represents the contrast reproduction ratio. The wavelengths in FIG. 2 are 450 nm, 460 nm, and 470 nm. The relay system 6 according to the present embodiment provides high resolution, as shown in FIG. 2.

Example 3 described in JP-A-2006-330410, which is the related art, will now be examined as Comparable Example. The relay system according to Comparative Example has telecentric portions at opposite sides and couples the enlargement-side image formation plane to the reduction-side image formation plane, which is a reduced enlargement-side image formation plane. The relay system according to Comparative Example includes a first lens group having positive power, a second lens group having negative power, and a third lens group having positive power. The first lens group in Comparative Example is formed of four lenses. The second lens group in Comparative Example is formed of an aperture stop and five lenses. The third lens group in Comparative Example is formed of three lenses.

Data on the relay system according to Comparative Example are listed in the table below. In the table, Yb0 represents the largest image height at the reduction-side image formation plane of the relay system according to Comparative Example, TL0 represents the overall length of the relay system according to Comparative Example, LA0 represents the length of the lens portion of the relay system according to Comparative Example, Fn0 represents the reduction-side f-number of the relay system according to Comparative Example, and E0 represents the magnification of the relay system according to Comparative Example. The data on the lenses of the relay system according to Comparative Example are described in Example 3 of JP-A-2006-330410 and are therefore omitted in this description.

Yb0 8.499 mm

TL0 229.353 mm

LA0 199.512 mm

Fn0 2.46

E0 3.00

The overall length of the relay system according to Comparative Example and the length of the lens portion of the relay system according to Comparative Example are greater than those of the relay system 6 according to the present embodiment under the conditions that the largest image height Yb0 at the reduction-side image formation plane of the relay system according to Comparative Example is equal to the largest image height Yb at the reduction-side image formation plane of the relay system 6 according to the present embodiment. That is, the relay system 6 according to the present embodiment is more compact than the relay system according to Comparative Example.

Figure 3:
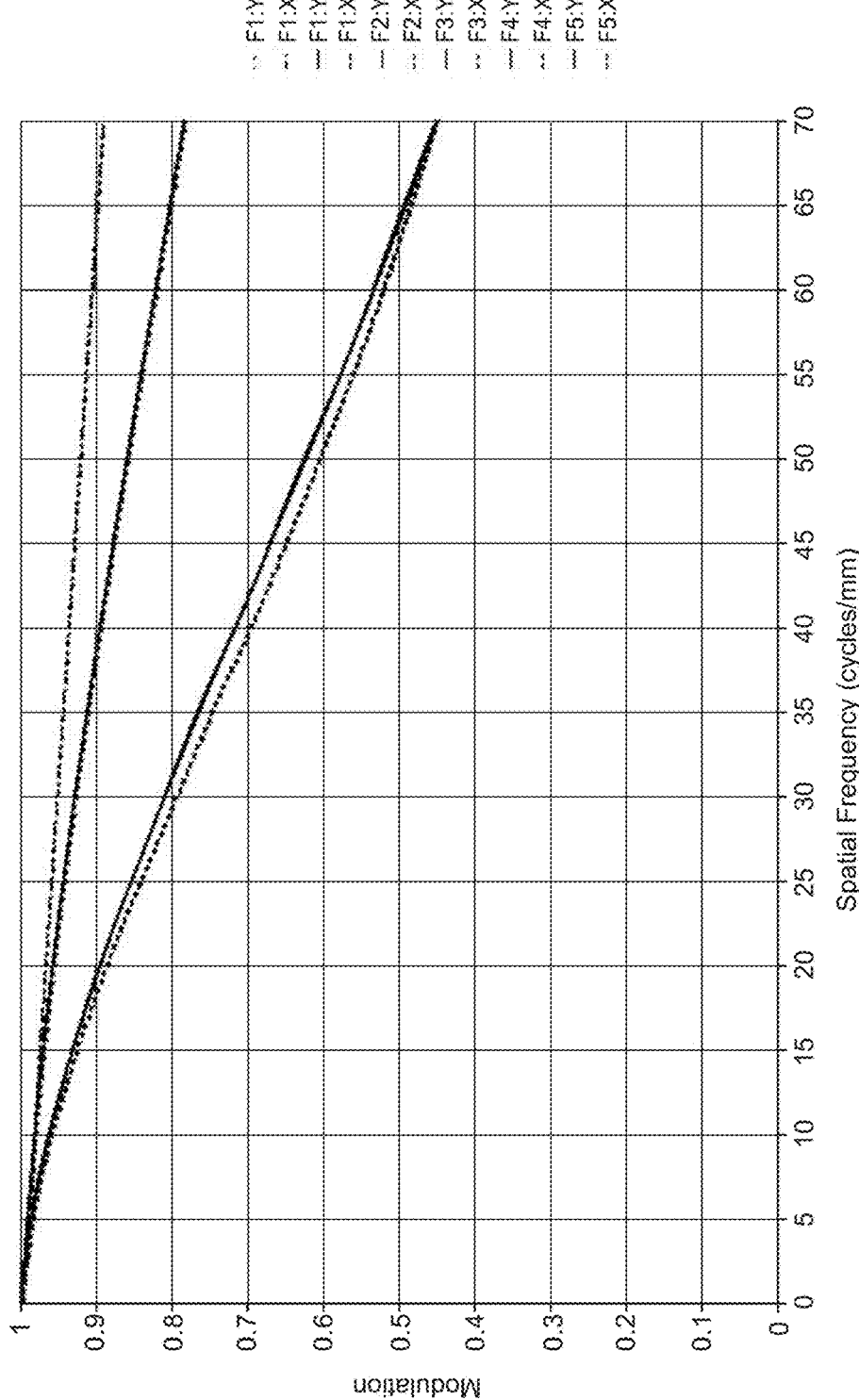
FIG. 3 shows the reduction-side MTF of the relay system according to Comparative Example.

FIG. 3 shows the reduction-side MTF of the relay system according to Comparative Example. In FIG. 3, the horizontal axis represents the spatial frequency, and the vertical axis represents the contrast reproduction ratio. The wavelengths in FIG. 3 are 450 nm, 460 nm, and 470 nm. Comparison between FIGS. 2 and 3 shows that the resolution of the relay system according to Comparative Example is poorer than that of the relay system 6 according to the present embodiment because the first lens group G1 and the third lens group G3 in Comparative Example differ from each other in terms of the number of lenses so that the two lens groups do not have symmetric lens configurations. That is, the comparison shows that the relay system 6 according to the present embodiment is more compact and has higher optical performance than the relay system according to Comparative Example.

Second Embodiment

Figure 4:
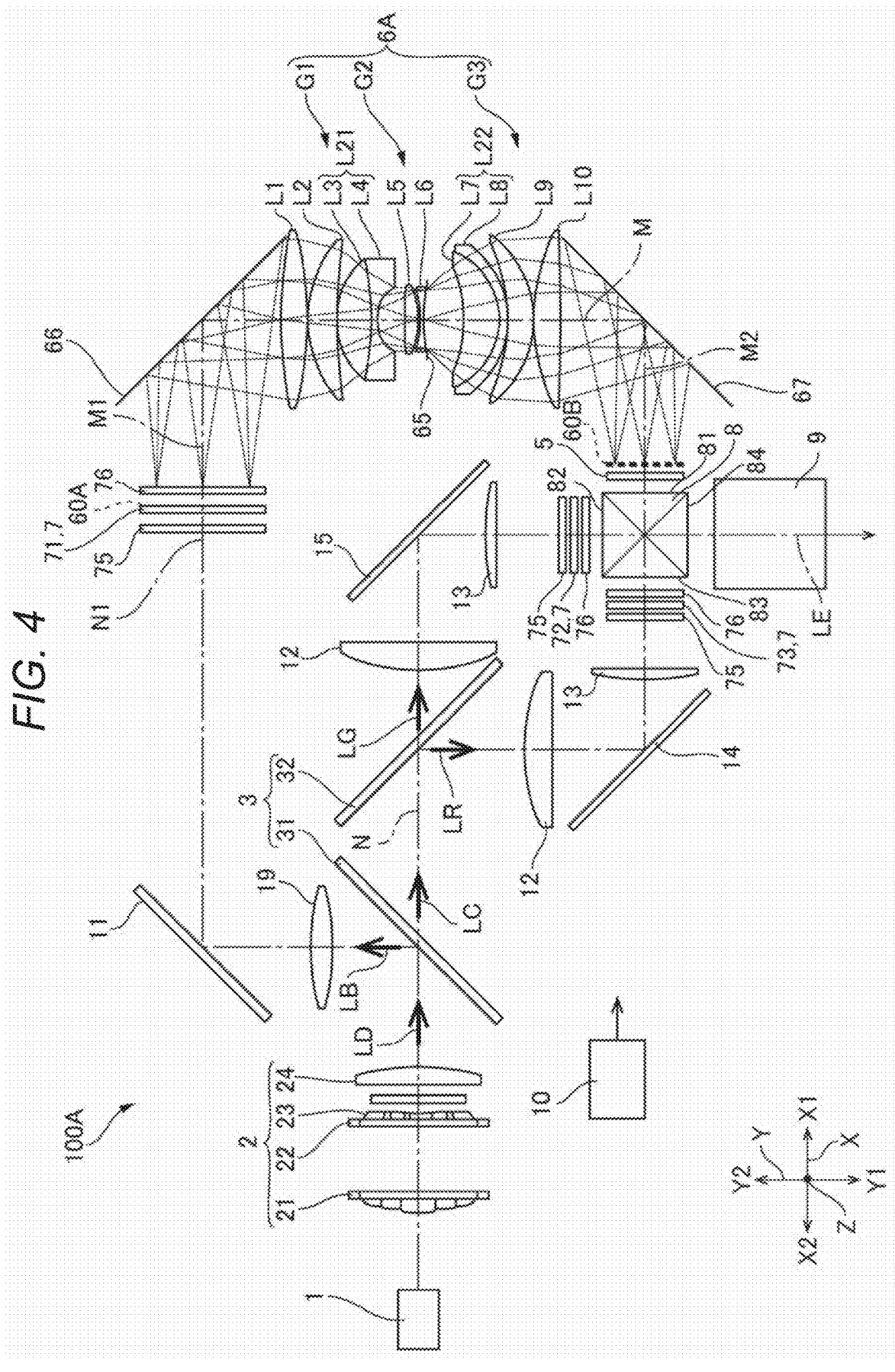
FIG. 4 is a schematic view of key parts of the projector using the relay system according to a second embodiment.

FIG. 4 is a schematic view of key parts of a projector 100A using a relay system 6A according to a second embodiment. Data on the lenses of the relay system 6A according to the second embodiment differ from those of the relay system 6 according to the first embodiment. Therefore, in the second embodiment, the configurations that are the same as those in the first embodiment have the same reference characters, and the same configurations will not be described in some cases.

Details of Relay System

The relay system 6A according to the present embodiment includes a first lens group G1 formed of a plurality of lenses and having positive power, a second lens group G2 including a diaphragm 65 and at least one negative lens and having negative power, and a third lens group G3 formed of a plurality of lenses and having positive power, as shown in FIG. 4. The first lens group G1, the second lens group G2, and the third lens group G3 are arranged along a second optical axis M of the relay system 6A.

The first lens group G1 is formed of four lenses L1 to L4. The lenses L1 to L4 are arranged in this order from the enlargement side toward the reduction side. The lens L1 has positive power. The lens L1 has convex surfaces at the enlargement and reduction sides. The lens L2 has positive power. The lens L2 has a convex surface at the enlargement side and a concave surface at the reduction side. The lens L3 has positive power. The lens L3 has convex surfaces at the enlargement and reduction sides. The lens L4 has negative power. The lens L4 has concave surfaces at the enlargement and reduction sides. The lens L3 and the lens L4 are bonded to each other into a cemented doublet L21.

The second lens group G2 is formed of two lenses L5 and L6 and a diaphragm 65. The lenses L5 and L6 and the diaphragm 65 are arranged in this order from the enlargement side toward the reduction side. The lens L5 has positive power. The lens L5 has a concave surface at the enlargement side and a convex surface at the reduction side. The lens L5 has aspheric surfaces at the enlargement and reduction sides. The lens L6 (negative lens) has negative power. The lens L6 has concave surfaces at the enlargement and reduction sides. The lens L6 has aspheric surfaces at the enlargement and reduction sides. Out of the lenses of the first lens group G1, the second lens group G2, and the third lens group G3, the lens L6 has the smallest effective radius.

The third lens group G3 is formed of four lenses L7 to L10. The lenses L7 to L10 are arranged in this order from the enlargement side toward the reduction side. The lens L7 has negative power. The lens L7 has a concave surface at the enlargement side and a convex surface at the reduction side. The lens L8 has positive power. The lens L8 has a concave surface at the enlargement side and a convex surface at the reduction side. The lens L9 has positive power. The lens L9 has a concave surface at the enlargement side and a convex surface at the reduction side. The lens L10 has positive power. The lens L10 has convex surfaces at the enlargement and reduction sides. The lens L7 and the lens L8 are bonded to each other into a cemented doublet L22.

The number of lenses of the first lens group G1 and the number of lenses of the third lens group G3 are equal to each other or four. The arrangement of the lens power of the lenses L1 to L4 of the first lens group G1, which are arranged from the enlargement side toward the reduction side, is the same as the arrangement of the lens power of the lenses L10 to L7 of the third lens group G3, which are arranged from the reduction side toward the enlargement side. Specifically, the arrangement of the lens power of the lenses L1 to L4 of the first lens group G1 is positive, positive, positive, and negative sequentially from the enlargement side toward the reduction side. The arrangement of the lens power of the lenses L10 to L7 of the third lens group G3 is positive, positive, positive, and negative sequentially from the reduction side toward the enlargement side.

The relay system 6A includes a first planar mirror 66 disposed between the enlargement-side image formation plane 60A and the first lens group G1, and a second planar mirror 67 disposed between the third lens group G3 and the reduction-side image formation plane 60B.

The first color light LB modulated by the first light modulator 71 travels in the first direction X1. The first color light LB having reached the first planar mirror 66 from the first light modulator 71 is reflected off the first planar mirror 66 in the third direction Y1. The first color light LB reflected off the first planar mirror 66 passes through the first lens group G1, the second lens group G2, and the third lens group G3 and reaches the second planar mirror 67. The first color light LB having reached the second planar mirror 67 is reflected off the second planar mirror 67 in the second direction X2. The first color light LB reflected off the second planar mirror 67 reaches the reduction-side image formation plane 60B.

The optical axis M1 of the enlargement-side image formation plane 60A and the optical axis M2 of the reduction-side image formation plane 60B are parallel to each other. The direction in which the first color light LB is incident on the enlargement-side image formation plane 60A is opposite the direction in which the first color light LB exits via the reduction-side image formation plane 60B.

The enlargement-side and reduction-side portions of the relay system 6A are telecentric portions. In the present embodiment, the angle between the central beam of each luminous flux and the optical axes M1 and M2 is smaller than or equal to ±20.

Data on the relay system 6A are listed in the table below. In the table, Yb represents the largest image height at the reduction-side image formation plane 60B of the relay system 6A, TL represents the overall length of the relay system 6A, LA represents the length of the lens portion of the relay system 6A, Fn represents the reduction-side f-number of the relay system 6A, and E represents the magnification of the relay system 6A.

Yb 8.499 mm
TL 157.655 mm
LA 58.000 mm
Fn 1.56
E 1.53

Data on the lenses of the relay system 6A are listed below. The surfaces of the lenses are numbered sequentially from the enlargement side toward the reduction side. Reference characters are given to the enlargement-side image formation plane, the first planar mirror, the lenses, the second planar mirror, and the reduction-side image formation plane. A surface number preceded by "*" indicates that the surface of the lens is an aspheric surface. R represents the radius of curvature. D represents the axial inter-surface spacing. Y represents the effective radius. R, D, and Y are each expressed in millimeters.

| Reference character | Surface number | R | D | Glass material | Refraction/ Reflection | Y |
|---|---|---|---|---|---|---|
| 60A | 0 | 0.00000 | 28.154788 | | Refraction | 13.0186 |
| 66 | 1 | 0.00000 | −18.500000 | | Reflection | 27.8830 |
| L1 | 2 | −107.63712 | −6.485840 | FDS90_HOYA | Refraction | 20.3360 |
| | 3 | 85.68986 | −0.100000 | | Refraction | 20.3200 |
| L2 | 4 | −29.56915 | −7.016961 | NBFD10_HOYA | Refraction | 18.1800 |
| | 5 | −115.35450 | −0.100000 | | Refraction | 17.2140 |
| L3 | 6 | −20.48438 | −8.554328 | BACD5_HOYA | Refraction | 13.7230 |
| L4 | 7 | 61.37167 | −1.300000 | FDS90_HOYA | Refraction | 11.8820 |
| | 8 | −9.70000 | −6.628532 | | Refraction | 7.9460 |
| L5 | *9 | 458.39535 | −3.324156 | BSC7_HOYA | Refraction | 7.8010 |
| | *10 | 31.39990 | −0.500000 | | Refraction | 7.6000 |
| L6 | *11 | 29.45725 | −0.805000 | FDS90_HOYA | Refraction | 7.2970 |
| | *12 | −114.50403 | −0.319784 | | Refraction | 7.3000 |
| 65 | 13 | 0.00000 | −8.897059 | | Refraction | 7.3000 |
| L7 | 14 | 37.01021 | −8.953012 | TAC8_HOYA | Refraction | 13.0850 |
| L8 | 15 | 17.80000 | −1.750000 | FDS90_HOYA | Refraction | 15.0450 |
| | 16 | 23.69118 | −0.100000 | | Refraction | 17.0080 |
| L9 | 17 | 40.40714 | −6.305598 | TAC8_HOYA | Refraction | 18.3270 |
| | 18 | 25.42241 | −0.100000 | | Refraction | 19.2350 |
| L10 | 19 | −47.93663 | −6.759729 | TAC8_HOYA | Refraction | 20.3860 |
| | 20 | 1012.76142 | −20.000000 | | Refraction | 20.0880 |

-continued

| 67 | 21 | 0.00000 | 23.000000 | | Reflection | 27.8550 |
|----|----|---------|-----------|--|-----------|---------|
| 60B | 22 | 0.00000 | 0.000000 | | Refraction | 8.4910 |

| | Surface number | | | |
|--|--|--|--|--|
| | 9 | 10 | 11 | 12 |
| Conic constant | −1.243444E−02 | −1.264546E+01 | 7.140675E+00 | −2.515701E+01 |
| Fourth-order coefficient | −4.15449E−05 | 3.10839E−04 | 1.04584E−04 | −6.4658E−05 |
| Sixth-order coefficient | −5.46074E−07 | −3.62938E−06 | −1.29098E−06 | 7.36208E−07 |
| Eighth-order coefficient | 2.88462E−09 | 1.21847E−08 | −2.16956E−10 | −2.45258E−09 |
| Tenth-order coefficient | −1.32879E−10 | | 1.06056E−10 | 1.38152E−10 |

When the largest image height at the enlargement-side image formation plane 60A and the reduction-side image formation plane 60B is set at 1, the angle of the center beam of each luminous flux at the enlargement-side image formation plane 60A with respect to the optical axis M1, and the angle of the center beam of each luminous flux at the reduction-side image formation plane 60B with respect to the optical axis M2 are listed below.

| Image height | Enlargement-side image formation plane | Reduction-side image formation plane |
|--------------|----------------------------------------|--------------------------------------|
| 1 | 1.998 | 1.972 |
| 0.9 | 1.928 | 1.990 |
| 0.85 | 1.875 | 1.965 |
| 0.75 | 1.736 | 1.863 |
| 0.5 | 1.255 | 1.394 |
| 0 | 0.000 | 0.000 |

The relay system 6A according to the present embodiment satisfies the conditional expressions below, $$D1 < L1 \quad (1)$$

$$D2 < L2 \quad (2)$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

In the present embodiment, the largest air spacing L1 is provided between the enlargement-side image formation plane 60A and the lens L1. The effective diameter D1 is the effective diameter of the enlargement-side image formation plane 60A adjacent to the largest air spacing L1. The second-largest air spacing L2 is provided between the lens L10 and the reduction-side image formation plane 60B. The effective diameter D2 is the effective diameter of the reduction-side image formation plane 60B adjacent to the second-largest air spacing L2. Specific numerical values of the parameters described above are listed below.

D1 26.0372 mm
L1 46.6548 mm

D2 16.9820 mm
L2 43.0000 mm

The relay system 6A according to the present embodiment therefore satisfies Conditional Expressions (1) and (2).

Effects and Advantages

Figure 5:
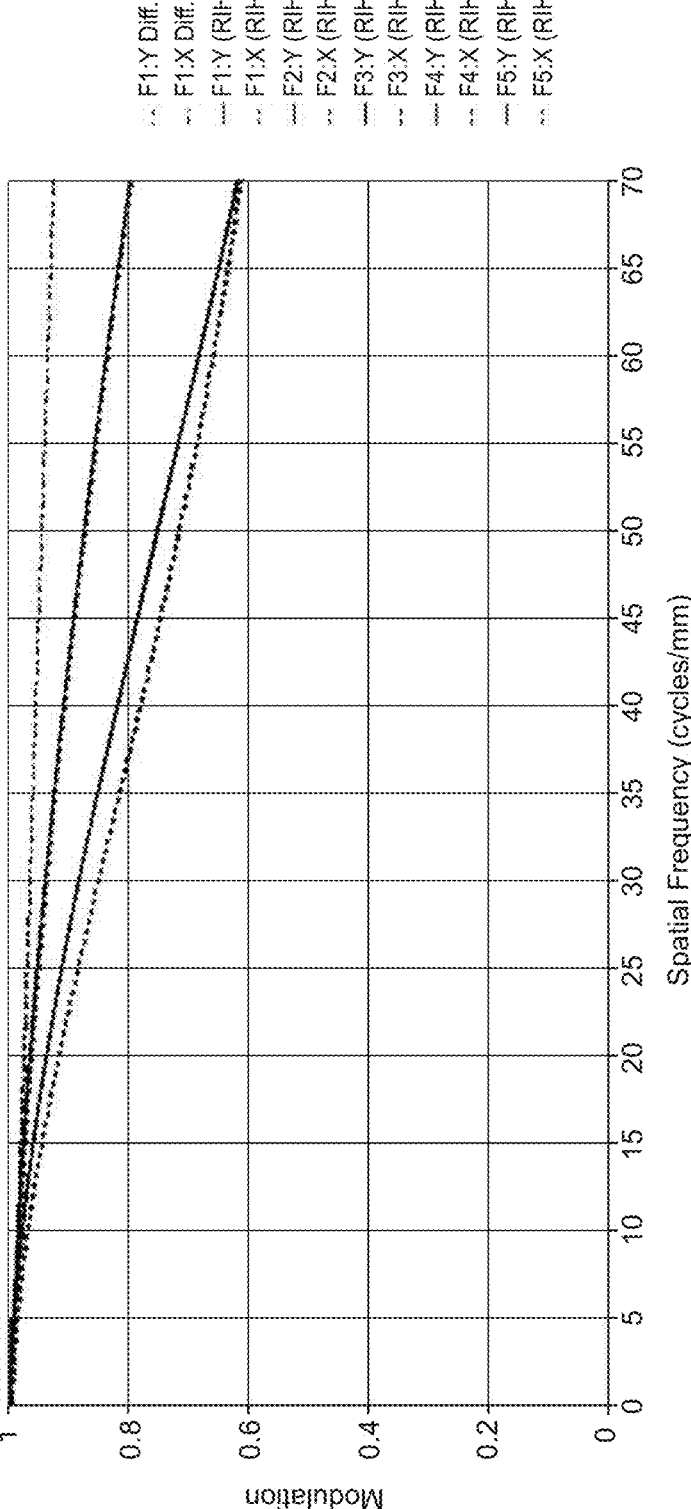
FIG. 5 shows the reduction-side MTF of the relay system according to the second embodiment.

The relay system 6A according to the second embodiment can provide the same effects and advantages as those provided by the first embodiment. FIG. 5 shows the reduction-side MTF of the relay system 6A according to the second embodiment. The comparison between FIGS. 5 and 3 shows that the relay system 6A according to the present embodiment has higher resolution and has therefore higher optical performance than the relay system according to Comparative Example.

Third Embodiment

Figure 6:
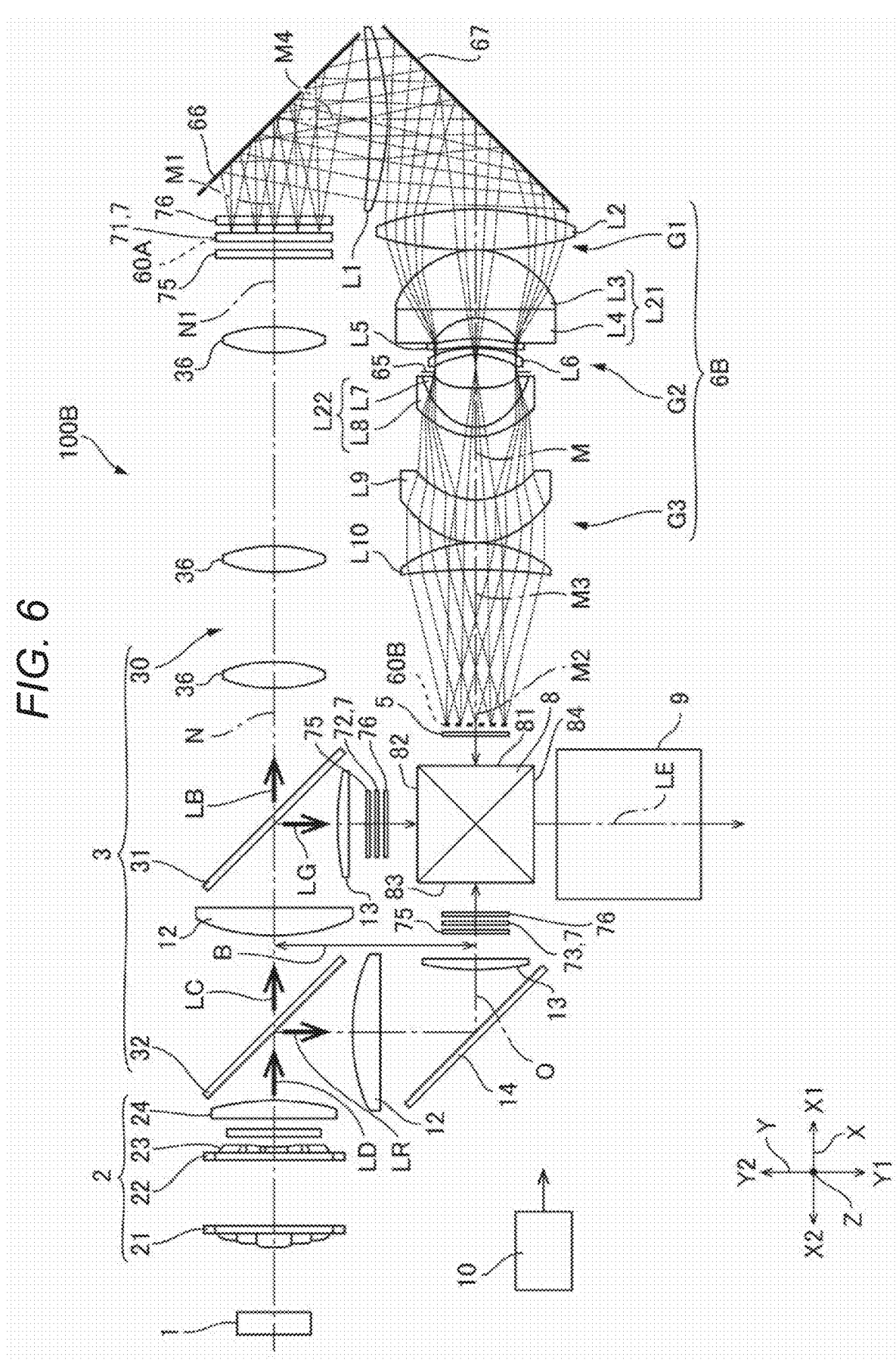
FIG. 6 is a schematic view of key parts of the projector using the relay system according to a third embodiment.

FIG. 6 is a schematic view of key parts of a projector 100B using a relay system 6B according to a third embodiment. Data on the lenses of and the configuration of the relay system 6B according to the third embodiment differ from those of the relay system 6 according to the first embodiment. Furthermore, the configuration of the color separation system 3 of the projector 100B according to the third embodiment differs from the configuration of the color separation system 3 of the projector 100 according to the first embodiment. Therefore, in the third embodiment, the configurations that are the same as those in the first embodiment have the same reference characters, and the same configurations will not be described in some cases.

The color separation system 3 includes the second dichroic mirror 32, the first dichroic mirror 31, and an extension system 30 sequentially arranged in the first direction X1, as shown in FIG. 6. The second dichroic mirror 32, the first dichroic mirror 31, and the extension system 30 are disposed along the first optical axis N of the color separation system 3. The second dichroic mirror 32 separates the output light LD into the third color light LR and combined light LC. The second dichroic mirror 32 reflects the third color light LR in the third direction Y1 and transmits the combined light LC in the first direction X1. The first dichroic mirror 31 separates the combined light LC into the first color light LB and the second color light LG (other color light). The first dichroic mirror 31 reflects the second color light LG in the third direction Y1 and transmits the first color light LB in the first direction X1. In the present embodiment, the first color light LB has a first wavelength band containing blue light.

The second color light LG has a second wavelength band containing green light. The third color light LR has a third wavelength band containing red light. The first wavelength band ranges, for example, from 420 to 500 nm. The second wavelength band ranges, for example, from 500 to 600 nm. The third wavelength band ranges, for example, from 600 to 680 nm. The wavelength band of the combined light LC ranges, for example, from 420 to 600 nm.

The extension system 30 extends the optical path of the color separation system 3 in the first direction X1. The extension system 30 includes a plurality of lenses 36. The plurality of lenses 36 are arranged along the first optical axis N of the color separation system 3. The extension system 30 is disposed between the first dichroic mirror 31 and the first light modulator 71.

A reflection mirror 14, which reflects in the first direction X1 the third color light LR separated by the second dichroic mirror 32, is disposed at a position shifted from the second dichroic mirror 32 in the third direction Y1. A lens 12 is disposed between the second dichroic mirror 32 and the reflection mirror 14, and another lens 12 is disposed between the second dichroic mirror 32 and the first dichroic mirror 31. A lens 13 is disposed at a position shifted from the reflection mirror 14 in the first direction X1, and another lens 13 is disposed at a position shifted from the first dichroic mirror 31 in the third direction Y1. The lenses 12 and 13 bring the second color light LG and the third color light LR separated by the color separation system 3 into focus in the vicinity of the corresponding light modulators 7.

The first light modulator 71 is disposed on the first optical axis N at a position shifted from the extension system 30 in the first direction X1. That is, the optical axis N1 of the first light modulator 71 coincides with the first optical axis N. The third light modulator 72 is disposed at a position where the third light modulator 72 faces the second surface 82 of the light combining prism 8. The fourth light modulator 73 is disposed at a position where the fourth light modulator 73 faces the third surface 83 of the light combining prism 8.

The effective area of the first light modulator 71 is larger than those of the third light modulator 72 and the fourth light modulator 73. In the present embodiment, the first light modulator 71 is a liquid crystal panel having a dimension of 1.03 inches, and the third light modulator 72 and the fourth light modulator 73 are each a liquid crystal panel having a dimension of 0.67 inches.

The relay system 6B couples the enlargement-side image formation plane 60A to the reduction-side image formation plane 60B, which is a reduced enlargement-side image formation plane 60A. The first light modulator 71 is disposed at the enlargement-side image formation plane 60A, and the relay system 6 reduces the luminous flux width of the first color light LB modulated by the first light modulator 71 to the size of the reduction-side image formation plane 60B. In the present embodiment, the relay system 6B reduces the 1.03-inch luminous flux width of the first color light LB modulated by the first light modulator 71 to a 0.67-inch luminous flux width in the reduction-side image formation plane 60B. The optical axis N1 of the first light modulator 71 coincides with the optical axis M1 of the enlargement-side image formation plane 60A. The reduction-side image formation plane 60B is set at a position where the reduction-side image formation plane 60B faces the first surface 81 of the light combining prism 8.

The projector 100B includes a polarizer 5 disposed between the reduction-side image formation surface 60B and the first surface 81. The polarizer 5 and the polarizer 76 at the light exiting side of the first light modulator 71 transmit a component linearly polarized in a single direction out of the polarized light components contained in the first color light LB.

Details of Relay System

The relay system 6B includes a first lens group G1 formed of a plurality of lenses and having positive power, a second lens group G2 including one or two lenses and having negative power with at least one of the lenses being negative lens, and a third lens group G3 formed of a plurality of lenses and having positive power with the three lens groups sequentially arranged from the enlargement side toward the reduction side, as shown in FIG. 6. The relay system 6B includes a diaphragm 65 between the second lens group G2 and the third lens group G3. The first lens group G1, the second lens group G2, and the third lens group G3 are arranged along a second optical axis M of the relay system 6B.

The first lens group G1 is formed of four lenses L1 to L4. The lenses L1 to L4 are arranged in this order from the enlargement side toward the reduction side. The lens L1 has positive power. The lens L1 has a concave surface at the enlargement side and a convex surface at the reduction side. The lens L2 has positive power. The lens L2 has convex surfaces at the enlargement and reduction sides. The lens L3 has positive power. The lens L3 has a convex surface at the enlargement side and a concave surface at the reduction side. The lens L4 has negative power. The lens L4 has concave surfaces at the enlargement and reduction sides. The lens L3 and the lens L4 are bonded to each other into a cemented doublet L21.

The second lens group G2 is formed of two lenses L5 and L6 and the diaphragm 65. The lenses L5 and L6 and the diaphragm 65 are arranged in this order from the enlargement side toward the reduction side. The lens L5 has positive power. The lens L5 has a concave surface at the enlargement side and a convex surface at the reduction side. The lens L5 has aspheric surfaces at the enlargement and reduction sides. The lens L6 (negative lens) has negative power. The lens L6 has a concave surface at the enlargement side and a convex surface at the reduction side. The lens L6 has aspheric surfaces at the enlargement and reduction sides. Out of the lenses of the first lens group G1, the second lens group G2, and the third lens group G3, the lens L6 has the smallest effective radius.

The third lens group G3 is formed of four lenses L7 to L10. The lenses L7 to L10 are arranged in this order from the enlargement side toward the reduction side. The lens L7 has negative power. The lens L7 has a concave surface at the enlargement side and a convex surface at the reduction side. The lens L8 has positive power. The lens L8 has a concave surface at the enlargement side and a convex surface at the reduction side. The lens L9 has positive power. The lens L9 has a concave surface at the enlargement side and a convex surface at the reduction side. The lens L10 has positive power. The lens L10 has a convex surface at the enlargement side and a concave surface at the reduction side. The lens L7 and the lens L8 are bonded to each other into a cemented doublet L22.

The lens L1 is disposed in a section M4, which extends in the Y-axis direction of the second optical axis M. The lenses L2 to L10 are disposed in a section M3, which extends in the X-axis direction of the second optical axis M.

The number of lenses of the first lens group G1 and the number of lenses of the third lens group G3 are equal to each other or four. The arrangement of the lens power of the lenses L1 to L4 of the first lens group G1, which are arranged from the enlargement side toward the reduction side, is the same as the arrangement of the lens power of the lenses L10 to L7 of the third lens group G3, which are arranged from the reduction side toward the enlargement side. Specifically, the arrangement of the lens power of the lenses L1 to L4 of the first lens group G1 is positive, positive, positive, and negative sequentially from the enlargement side toward the reduction side. The arrangement of the lens power of the lenses L10 to L7 of the third lens group G3 is positive, positive, positive, and negative sequentially from the reduction side toward the enlargement side.

The relay system 6 includes a first planar mirror 66 disposed between the enlargement-side image formation plane 60A and the first lens group G1, and a second planar mirror 67 disposed in the first lens group G1 and between the lens L1 and the lens L2. The first planar mirror 66 has a planar shape. The first planar mirror 66 is disposed at a position shifted from the lens L1 in the fourth direction Y2. The second planar mirror 67 has a planar shape. The second planar mirror 67 is disposed at a position shifted from the lens L2 in the first direction X1. The first planar mirror 66 and the second planar mirror 67 each deflect the beams by 90°.

The first color light LB modulated by the first light modulator 71 travels in the first direction X1. The first color light LB having reached the first planar mirror 66 from the first light modulator 71 is reflected off the first planar mirror 66 in the third direction Y1. The first color light LB reflected off the first planar mirror 66 passes through the lens L1 and reaches the second planar mirror 67. The first color light LB having reached the second planar mirror 67 is reflected off the second planar mirror 67 in the second direction X2. The first color light LB reflected off the second planar mirror 67 passes through the lenses L2 to L10 and reaches the reduction-side image formation plane 60B.

The optical axis M1 of the enlargement-side image formation plane 60A and the optical axis M2 of the reduction-side image formation plane 60B are parallel to each other. The direction in which the first color light LB is incident on the enlargement-side image formation plane 60A is the first direction X1. The direction in which the first color light LB exits via the reduction-side image formation plane 60B is the second direction X2. That is, the direction in which the first color light LB is incident on the enlargement-side image formation plane 60A is opposite the direction in which the first color light LB exits via the reduction-side image formation plane 60B.

The enlargement-side image formation plane 60A and the reduction-side image formation plane 60B are located at positions shifted in the first direction X1 from the first surface 81 of the light combining prism 8 or at the same side thereof. That is, the first light modulator 71 and the reduction-side image formation plane 60B are located at positions shifted in the first direction X1 from the first surface 81 of the light combining prism 8 or at the same side thereof.

The enlargement-side and reduction-side portions of the relay system 6B are telecentric portions. In the present embodiment, the angle between the central beam of each luminous flux and the optical axes M1 and M2 is smaller than or equal to ±20.

The first optical axis N of the color separation system 3 is parallel to at least the section M3 of the second optical axis M of the relay system 6B. The section M3 of the second optical axis M is perpendicular to the first surface 81 of the light combining prism 8, on which the first color light LB is incident. When viewed in the Y-axis direction perpendicular to the first optical axis N and the section M3 of the second optical axis M, the extension system 30 overlaps with the relay system 6B.

Data on the relay system 6B are listed in the table below. In the table, Yb represents the largest image height at the reduction-side image formation plane 60B of the relay system 6B, TL represents the overall length of the relay system 6B, LA represents the length of the lens portion of the relay system 6B, Fn represents the reduction-side f-number of the relay system 6B, and E represents the magnification of the relay system 6B.

Yb 8.499 mm
TL 195.549 mm
LA 117.711 mm
Fn 1.53
E 1.53

Data on the lenses of the relay system 6B are listed below. The surfaces of the lenses are numbered sequentially from the enlargement side toward the reduction side. Reference characters are given to the enlargement-side image formation plane, the first planar mirror, the lenses, the second planar mirror, and the reduction-side image formation plane. A surface number preceded by "*" indicates that the surface of the lens is an aspheric surface. R represents the radius of curvature. D represents the axial inter-surface spacing. Y represents the effective radius. R, D, and Y are each expressed in millimeters.

| Reference character | Surface number | R | D | Glass material | Refraction/ Reflection | Y |
|---|---|---|---|---|---|---|
| 60A | 0 | 0.00000 | 26.831800 | | Refraction | 13.0186 |
| 66 | 1 | 0.00000 | −22.168200 | | Reflection | 28.9460 |
| L1 | 2 | 160.00000 | −4.049038 | NBFD10__HOYA | Refraction | 21.0620 |
| | 3 | 70.13655 | −22.000000 | | Refraction | 21.3930 |
| 67 | 4 | 0.00000 | 22.500000 | | Reflection | 31.8450 |
| L2 | 5 | 74.51888 | 7.645917 | TAFD5F__HOYA | Refraction | 22.7520 |
| | 6 | −127.66049 | 0.100000 | | Refraction | 22.4810 |
| L3 | 7 | 23.12883 | 11.320403 | TAFD5F__HOYA | Refraction | 17.8530 |
| L4 | 8 | 7100.87695 | 1.900000 | FD60W__HOYA | Refraction | 15.7020 |
| | 9 | 14.01950 | 4.019656 | | Refraction | 10.6400 |
| L5 | *10 | 25.85743 | 1.405542 | MTAFD51__HOYA | Refraction | 10.5960 |
| | *11 | 82.03475 | 0.600000 | | Refraction | 10.3320 |
| L6 | *12 | 60.86701 | 0.805000 | MCFD80__HOYA | Refraction | 10.1320 |
| | *13 | 14.80852 | 2.391067 | | Refraction | 9.6110 |
| 65 | 14 | 0.00000 | 3.541583 | | Refraction | 9.6000 |
| L7 | 15 | −26.07564 | 7.416302 | TAFD5F__HOYA | Refraction | 10.0960 |
| L8 | 16 | −13.40000 | 1.900000 | FDS90__HOYA | Refraction | 11.3050 |
| | 17 | −21.43281 | 12.801483 | | Refraction | 12.8030 |

-continued

| | | | | | | | |
|---|---|---|---|---|---|---|---|
| L9 | 18 | −21.82517 | 8.261107 | NBFD13_HOYA | Refraction | 14.2000 |
| | 19 | −23.57697 | 0.100000 | | Refraction | 16.9120 |
| L10 | 20 | 36.85821 | 4.954069 | TAFD5F_HOYA | Refraction | 17.1140 |
| | 21 | 132.73720 | 28.837816 | | Refraction | 16.7120 |
| 60B | 22 | 0.00000 | 0.000000 | | Refraction | 8.4970 |

| | Surface number | | | |
|---|---|---|---|---|
| | 10 | 11 | 12 | 13 |
| Conic constant | −1.258405E+00 | 3.594804E+01 | 2.323815E+01 | 1.236475E−01 |
| Fourth-order coefficient | −9.420159E−05 | | | −1.503907E−04 |
| Sixth-order coefficient | 2.234791E−09 | | | 0 |
| Eighth-order coefficient | 0 | | | 0 |
| Tenth-order coefficient | 0 | | | 0 |

When the largest image height at the enlargement-side image formation plane 60A and the reduction-side image formation plane 60B is set at 1, the angle of the center beam of each luminous flux at the enlargement-side image formation plane 60A with respect to the optical axis M1, and the angle of the center beam of each luminous flux at the reduction-side image formation plane 60B with respect to the optical axis M2 are listed below.

| Image height | Enlargement-side image formation plane | Reduction-side image formation plane |
|---|---|---|
| 1 | 1.661 | 1.927 |
| 0.9 | 1.606 | 1.834 |
| 0.85 | 1.563 | 1.773 |
| 0.75 | 1.452 | 1.628 |
| 0.5 | 1.057 | 1.162 |
| 0 | 0.000 | 0.000 |

The relay system 6B according to the present embodiment satisfies the conditional expressions below, $$D1 < L1 \tag{1}$$

$$D2 < L2 \tag{2}$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

In the present embodiment, the largest air spacing L1 is provided between the enlargement-side image formation plane 60A and the lens L1. The effective diameter D1 is the effective diameter of the enlargement-side image formation plane 60A adjacent to the largest air spacing L1. The second-largest air spacing L2 is provided between the lens L1 and the lens L2. The effective diameter D2 is the effective diameter of the lens L1 adjacent to the second-largest air spacing L2. Specific numerical values of the parameters described above are listed below.

D1 26.0372 mm
L1 49.0000 mm
D2 42.7840 mm
L2 44.5000 mm

The relay system 6B according to the present embodiment therefore satisfies Conditional Expressions (1) and (2).

Effects and Advantages

Figure 7:
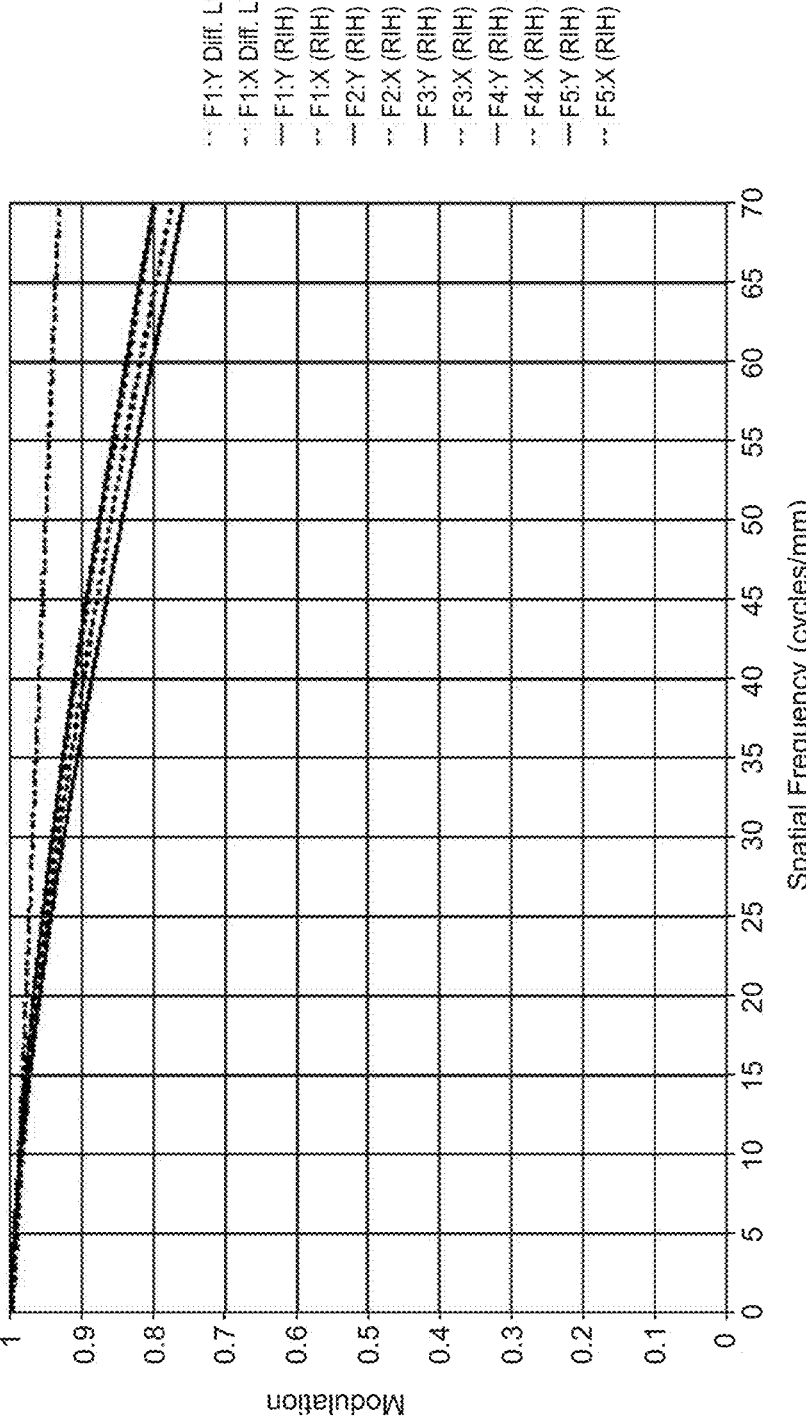
FIG. 7 shows the reduction-side MTF of the relay system according to the third embodiment.

The relay system 6B according to the third embodiment can provide the same effects and advantages as those provided by the first embodiment. FIG. 7 shows the reduction-side MTF of the relay system 6B according to the third embodiment. The comparison between FIGS. 7 and 3 shows that the relay system 6B according to the present embodiment has higher resolution and has therefore higher optical performance than the relay system according to Comparative Example.

Fourth Embodiment

Figure 8:
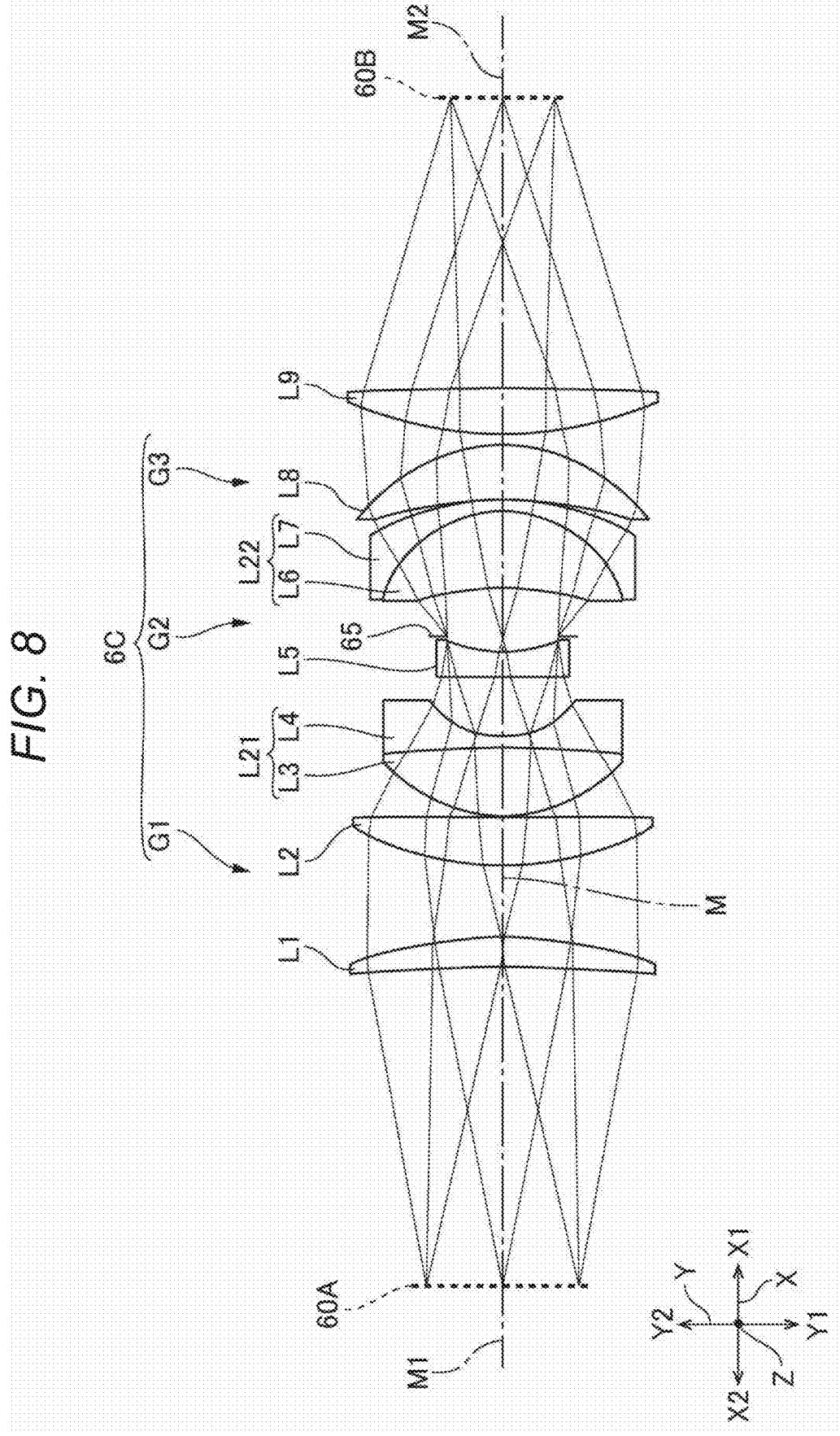
FIG. 8 is a beam diagram showing beams traveling in the relay system according to a fourth embodiment.

FIG. 8 is a beam diagram showing beams traveling in a relay system 6C according to a fourth embodiment. The relay system 6C couples the enlargement-side image formation plane 60A to the reduction-side image formation plane 60B, which is a reduced enlargement-side image formation plane 60A, as shown in FIG. 8. The relay system 6C includes a first lens group G1 formed of a plurality of lenses and having positive power, a second lens group G2 formed of a diaphragm 65 and one negative lens and having negative power, and a third lens group G3 formed of a plurality of lenses and having positive power, with the three lens groups sequentially arranged in the direction in which the beams travel from the enlargement side toward the reduction side. The first lens group G1, the second lens group G2, and the third lens group G3 are arranged along the second optical axis M of the relay system 6C. In the present embodiment, the optical axis M1 of the enlargement-side image formation plane 60A and the optical axis M2 of the reduction-side image formation plane 60B coincide linearly with the second optical axis M of the relay system 6C.

The first lens group G1 is formed of four lenses L1 to L4. The lenses L1 to L4 are arranged in this order from the enlargement side toward the reduction side. The lens L1 has positive power. The lens L1 has a concave surface at the enlargement side and a convex surface at the reduction side.

The lens L2 has positive power. The lens L2 has convex surfaces at the enlargement and reduction sides. The lens L3 has positive power. The lens L3 has convex surfaces at the enlargement and reduction sides. The lens L4 has negative power. The lens L4 has concave surfaces at the enlargement and reduction sides. The lens L3 and the lens L4 are bonded to each other into a cemented doublet L21.

The second lens group G2 is formed of one lens L5 and the diaphragm 65. The lens L5 and the diaphragm 65 are arranged in this order from the enlargement side toward the reduction side. The lens L5 (negative lens) has negative power. The lens L5 has a convex surface at the enlargement side and a concave surface at the reduction side. The lens L5 has aspheric surfaces at the enlargement and reduction sides. Out of the lenses of the first lens group G1, the second lens group G2, and the third lens group G3, the lens L5 has the smallest effective radius.

The third lens group G3 is formed of four lenses L6 to L9. The lenses L6 to L9 are arranged in this order from the enlargement side toward the reduction side. The lens L6 has negative power. The lens L7 has a concave surface at the enlargement side and a convex surface at the reduction side. The lens L7 has positive power. The lens L7 has a concave surface at the enlargement side and a convex surface at the reduction side. The lens L8 has positive power. The lens L8 has a concave surface at the enlargement side and a convex surface at the reduction side. The lens L9 has positive power. The lens L9 has convex surfaces at the enlargement and reduction sides. The lenses L6 and L7 are bonded to each other into a cemented doublet L22.

The number of lenses of the first lens group G1 and the number of lenses of the third lens group G3 are equal to each other or four. The arrangement of the lens power of the lenses L1 to L4 of the first lens group G1, which are arranged from the enlargement side toward the reduction side, is the same as the arrangement of the lens power of the lenses L9 to L6 of the third lens group G3, which are arranged from the reduction side toward the enlargement side. Specifically, the arrangement of the lens power of the lenses L1 to L4 of the first lens group G1 is positive, positive, positive, and negative sequentially from the enlargement side toward the reduction side. The arrangement of the lens power of the lenses L9 to L6 of the third lens group G3 is positive, positive, positive, and negative sequentially from the reduction side toward the enlargement side.

The enlargement-side and reduction-side portions of the relay system 6C are telecentric portions. In the present embodiment, the angle between the central beam of each luminous flux and the optical axes M1 and M2 is smaller than or equal to ±20.

Data on the relay system 6C are listed in the table below. In the table, Yb represents the largest image height at the reduction-side image formation plane 60B of the relay system 6C, TL represents the overall length of the relay system 6C, LA represents the length of the lens portion of the relay system 6C, Fn represents the reduction-side f-number of the relay system 6C, and E represents the magnification of the relay system 6C.

Yb 8.499 mm

TL 168.000 mm

LA 81.787 mm

Fn 1.64

E 1.53

Data on the lenses of the relay system 6C are listed below. The surfaces of the lenses are numbered sequentially from the enlargement side toward the reduction side. Reference characters are given to the enlargement-side image formation plane and the reduction-side image formation plane. A surface number preceded by "*" indicates that the surface of the lens is an aspheric surface. R represents the radius of curvature. D represents the axial inter-surface spacing. Y represents the effective radius. R, D, and Y are each expressed in millimeters.

| Reference character | Surface number | R | D | Glass material | Refraction/ Reflection | Y |
|---|---|---|---|---|---|---|
| 60A | 0 | 0.00000 | 45.212882 | | Refraction | 13.0186 |
| L1 | 1 | −184.09700 | 4.100000 | FDS90_HOYA | Refraction | 19.9480 |
| | 2 | −62.88502 | 10.166130 | | Refraction | 20.2050 |
| L2 | 3 | 42.01633 | 6.879150 | TAFD5F_HOYA | Refraction | 19.6120 |
| | 4 | −2625.89736 | 0.370342 | | Refraction | 19.1210 |
| L3 | 5 | 22.31374 | 9.520045 | LAC14_HOYA | Refraction | 15.6100 |
| L4 | 6 | −149.53242 | 1.500000 | FF8_HOYA | Refraction | 13.8930 |
| | 7 | 12.46324 | 8.511899 | | Refraction | 9.6350 |
| L5 | *8 | 48.67992 | 3.652066 | BSC7_HOYA | Refraction | 8.4880 |
| | *9 | 15.14022 | 1.597311 | | Refraction | 7.9300 |
| 65 | 10 | 0.00000 | 7.267946 | | Refraction | 7.6000 |
| L6 | 11 | −45.52784 | 11.124290 | TAC8_HOYA | Refraction | 12.0110 |
| L7 | 12 | −17.50000 | 1.500000 | FDS90_HOYA | Refraction | 14.5630 |
| | 13 | −36.45624 | 0.100000 | | Refraction | 17.3600 |
| L8 | 14 | −58.12613 | 7.525796 | TAC8_HOYA | Refraction | 18.2860 |
| | 15 | −25.29455 | 1.736639 | | Refraction | 19.1190 |
| L9 | 16 | 54.32842 | 6.235505 | TAFD5F_HOYA | Refraction | 20.3670 |
| | 17 | −598.53650 | 41.000000 | | Refraction | 20.1000 |
| 60B | 18 | 0.00000 | 0.000000 | | Refraction | 8.4940 |

| | Surface number | |
|---|---|---|
| | 8 | 9 |
| Conic constant | −4.328137E+00 | −3.211675E+00 |
| Fourth-order coefficient | −1.372099E−04 | −3.533897E−05 |
| Sixth-order coefficient | 1.782276E−07 | −7.351476E−09 |

-continued

| | | |
|---|---|---|
| Eighth-order coefficient | −1.071556E−09 | 4.050635E−10 |
| Tenth-order coefficient | −8.726952E−13 | 0 |

When the largest image height at the enlargement-side image formation plane 60A and the reduction-side image formation plane 60B is set at 1, the angle of the center beam of each luminous flux at the enlargement-side image formation plane 60A with respect to the optical axis M1, and the angle of the center beam of each luminous flux at the reduction-side image formation plane 60B with respect to the optical axis M2 are listed below.

| Image height | Enlargement-side image formation plane | Reduction-side image formation plane |
|---|---|---|
| 1 | 1.698 | 1.915 |
| 0.9 | 1.658 | 1.889 |
| 0.85 | 1.618 | 1.852 |
| 0.75 | 1.509 | 1.740 |
| 0.5 | 1.101 | 1.288 |
| 0 | 0.000 | 0.000 |

The relay system 6C according to the present embodiment satisfies the conditional expressions below, $$D1 < L1 \tag{1}$$

$$D2 < L2 \tag{2}$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

In the present embodiment, the largest air spacing L1 is provided between the enlargement-side image formation plane 60A and the lens L1. The effective diameter D1 is the effective diameter of the enlargement-side image formation plane 60A adjacent to the largest air spacing L1. The second-largest air spacing L2 is provided between the lens L9 and the reduction-side image formation plane 60B. The effective diameter D2 is the effective diameter of the reduction-side image formation plane 60B adjacent to the second-largest air spacing L2. Specific numerical values of the parameters described above are listed below.

D1 26.0372 mm
L1 45.2129 mm
D2 16.9980 mm
L2 41.0000 mm

The relay system 6C according to the present embodiment therefore satisfies Conditional Expressions (1) and (2).

Effects and Advantages

Figure 9:
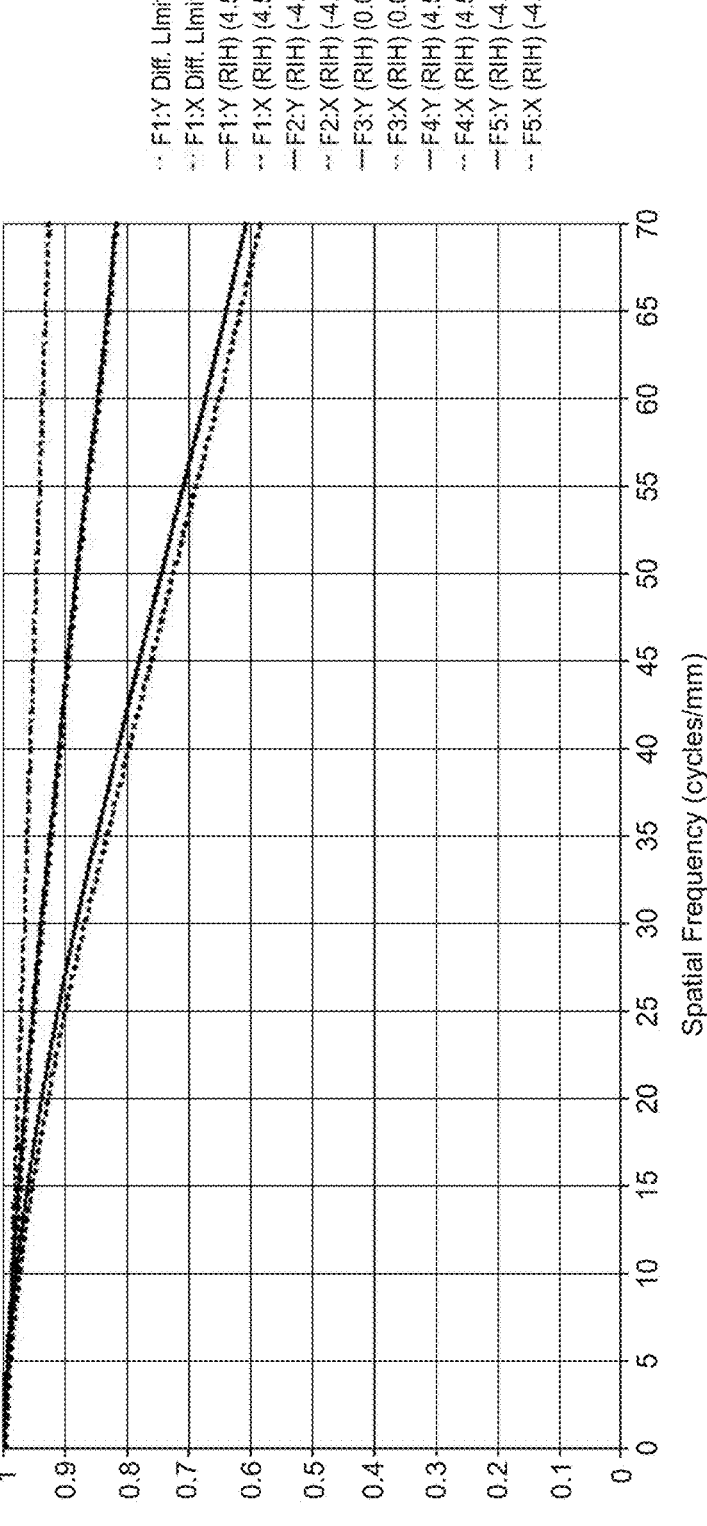
FIG. 9 shows the reduction-side MTF of the relay system according to the fourth embodiment.

In the present embodiment, the second lens group G2 is formed of the diaphragm 65 and the single negative lens L5. The thus configured relay system 6C according to the fourth embodiment can provide the same effects and advantages as those provided by the first embodiment. FIG. 9 shows the reduction-side MTF of the relay system 6C according to the fourth embodiment. The comparison between FIGS. 9 and 3 shows that the relay system 6C according to the present embodiment has higher resolution and has therefore higher optical performance than the relay system according to Comparative Example. The relay system 6C according to the present embodiment may include the first planar mirror 66 and the second planar mirror 67, as in the first embodiment.

Other Examples

In the third embodiment, the second lens group G2 is formed of the diaphragm 65 and the negative lens L5, which is a single lens, but the single negative lens is not limited to a single lens. The single negative lens may be a single cemented unit lens formed of a plurality of lenses cemented to each other and having negative power. The thus configured single cemented unit lens can suppress the chromatic aberration of magnification produced by the relay system 6.

The relay system 6 having the form described above is not necessarily used in a projector. The relay system 6 having the form described above can be used in apparatuses using optical an optical system that couples the enlargement-side image formation plane to the reduction-side image formation plane, which is a reduced enlargement-side image formation plane, such as exposure machines and steppers.

SUMMARY OF PRESENT DISCLOSURE

The present disclosure will be summarized below as additional remarks.

Additional Remark 1

A relay system that couples an enlargement-side image formation plane to a reduction-side image formation plane that is a reduced version of the enlargement-side image formation plane, the relay system including a first lens group formed of a plurality of lenses and having positive power, a second lens group including a diaphragm and at least one negative lens and having negative power, and a third lens group formed of a plurality of lenses and having positive power, the three lens groups sequentially arranged in the direction in which the beams travel from the enlargement side toward the reduction side, the number of lenses of the first lens group and the number of lenses of the third lens group being equal to each other, the arrangement of the lens power of the plurality of lenses of the first lens group, which are arranged from the enlargement side toward the reduction side, being the same as the arrangement of the lens power of the plurality of lenses of the third lens group, which are arranged from the reduction side toward the enlargement, and the enlargement-side and reduction-side portions of the relay system being telecentric portions.

The lens configuration of the first lens group, the lenses of which are arranged from the enlargement side toward the reduction side, and the lens configuration of the third lens group, the lenses of which are arranged from the reduction side toward the enlargement side, have symmetric lens configurations, so that the variety of aberrations produced by the first lens group can be cancelled out by the third lens group. As a result, the optical performance of the relay system can be improved. Since the portions of the relay system at opposite sides are telecentric portions, the relay system is incorporated in the projector with less accuracy and more readily positioned than in the case where the portions of the relay system at opposite sides are not telecentric portions.

Additional Remark 2

The relay system described in the additional remark 1, in which the first lens group includes two positive lenses and a cemented unit lens sequentially arranged from the enlargement side toward the reduction side, and the third lens group includes two positive lenses and a cemented unit lens sequentially arranged from the reduction side toward the enlargement side.

Since the first and third lens groups each have a cemented unit lens, the chromatic aberration of magnification produced by the first lens group can be satisfactorily cancelled out by the third lens group. Furthermore, since the first and third lens groups each include the two positive lenses, the overall length of the relay system can be reduced.

Additional Remark 3

The relay system described in the additional remark 1 or 2, in which out of the lenses of the first, second, and third lens groups, the lens having the smallest effective diameter has aspheric surfaces.

All the beams are divergent when passing through the lens having the smallest effective diameter. The lens having the smallest effective diameter and aspheric surfaces can therefore satisfactorily remove the variety of aberrations at all image heights. The optical performance of the relay system can thus be improved.

Additional Remark 4

The relay system described in any one of the additional remark 1 to 3, in which the second lens group is formed of the diaphragm and the single negative lens.

Additional Remark 5

The relay system described in any one of the additional remarks 1 to 4, in which the relay system satisfies the conditional expressions below, $$D1 < L1$$

$$D2 < L2$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of a lens or an image formation plane adjacent to the second largest air spacing, that is, either the effective diameter of the lens or the effective diameter of the other one of the enlargement-side and reduction-side image formation planes.

The configuration described above readily allows the angle of the optical path to be changed to any value at the largest air spacing and the second-largest air spacing, so that the relay system is laid out with improved flexibility. Furthermore, the beams are readily controlled without a large angle of refraction at the lenses adjacent to the largest air spacing and the second-largest air spacing.

Additional Remark 6

The relay system described in any one of the additional remarks 1 to 4, in which the relay system satisfies the conditional expressions below, $$D1 < L1$$

$$D2 < L2$$

where L1 represents the largest air spacing, D1 represents the smaller effective diameter of a lens or an image formation plane adjacent to the largest air spacing, that is, either the effective diameter of the lens or the effective diameter of one of the enlargement-side and reduction-side image formation planes, L2 represents the second largest air spacing, and D2 represents the smaller effective diameter of two lenses, that is, the effective diameter of the lens adjacent to the second largest air spacing.

The configuration described above readily allows the angle of the optical path to be changed to any value at the largest air spacing and the second-largest air spacing, so that the relay system is laid out with improved flexibility. Furthermore, the beams are readily controlled without a large angle of refraction at the lenses adjacent to the largest air spacing and the second-largest air spacing.

Additional Remark 7

The relay system described in the additional remark 5, further including a first planar mirror disposed in the largest air spacing, and a second planar mirror disposed in the second-largest air spacing, the largest air spacing provided between the enlargement-side image formation plane and the first lens group, and the second-largest air spacing provided between the third lens group and the reduction-side image formation plane.

The first and second planar mirrors are therefore readily disposed in the relay system.

Additional Remark 8

The relay system described in the additional remark 6, further including a first planar mirror disposed in the largest air spacing, and a second planar mirror disposed in the second-largest air spacing, the largest air spacing provided between the enlargement-side image formation plane and the first lens group, and the second-largest air spacing provided in the first lens group.

The first and second planar mirrors are therefore readily disposed in the relay system.

Additional Remark 9

The relay system described in the additional remark 7 or 8, in which the first and second planar mirrors each deflect the beams, the optical axis of the enlargement-side image formation plane and the optical axis of the reduction-side image formation plane are parallel to each other, and the direction in which the beams are incident on the enlargement-side image formation plane is opposite the direction in which the beams are incident on the reduction-side image formation plane.

The relay system can therefore efficiently deflect the optical path by 180°.

Additional Remark 10

A projector including the relay system described in any one of the additional remarks 1 to 6, the projector including a light source, a color separation system that separates white light output from the light source into first color light having a first wavelength band containing blue light and other color light having a wavelength band longer than the first wavelength band, a first light modulator that modulates the first color light separated by the color separation system, a second light modulator that modulates the other color light separated by the color separation system, the relay system, in which the first light modulator is disposed at the enlargement-side image formation plane and which reduces the luminous flux width of the first color light modulated by the first light modulator to the size of the reduction-side image formation plane, a light combining prism that combines the first color light the luminous flux width of which has been reduced by the relay system and the other color light modulated by the second light modulator with each other into the combined light and outputs the combined light, and a projection system that projects the combined light output from the light combining prism, the effective area of the first light modulator being larger than the effective area of the second light modulator, the relay system including a first planar mirror disposed between the enlargement-side image formation plane and the first lens group, and a second planar mirror disposed between the third lens group and the reduction-side image formation plane, the first and second planar mirrors each deflecting the beams, the optical axis of the enlargement-side image formation plane and the optical axis of the reduction-side image formation plane being parallel to each other, and the direction in which the first color light is incident on the enlargement-side image formation plane being opposite the direction in which the first color light exits via the reduction-side image formation plane.

The relay system having an optical path deflected by 180° can thus be incorporated in the projector.

Additional Remark 11

A projector including the relay system described in any one of the additional remarks 1 to 6, the projector including a light source, a color separation system that separates white light output from the light source into first color light having a first wavelength band containing blue light and other color light having a wavelength band longer than the first wavelength band, a first light modulator that modulates the first color light separated by the color separation system, a second light modulator that modulates the other color light separated by the color separation system, the relay system, in which the first light modulator is disposed at the enlargement-side image formation plane, and which reduces the luminous flux width of the first color light modulated by the first light modulator to the size of the reduction-side image formation plane, a light combining prism that combines the first color light the luminous flux width of which has been reduced by the relay system and the other color light modulated by the second light modulator with each other into the combined light and outputs the combined light, and a projection system that projects the combined light output from the light combining prism, the effective area of the first light modulator being larger than the effective area of the second light modulator, the relay system including a first planar mirror disposed between the enlargement-side image formation plane and the first lens group, and a second planar mirror disposed in the first lens group, the first and second planar mirrors each deflecting the beams, the optical axis of the enlargement-side image formation plane and the optical axis of the reduction-side image formation plane being parallel to each other, and the direction in which the first color light is incident on the enlargement-side image formation plane being opposite the direction in which the first color light exits via the reduction-side image formation plane.

The relay system having an optical path deflected by 180° can thus be incorporated in the projector.

What is claimed is:

1. A relay system that couples an enlargement-side image formation plane at an enlargement side to a reduction-side image formation plane at a reduction side, the reduction-side image formation plane being a reduced version of the enlargement-side image formation plane, the relay system comprising:

a first lens group formed of a plurality of lenses and having positive power; a second lens group including a diaphragm and at least one negative lens and having negative power; and a third lens group formed of a plurality of lenses and having positive power, the first lens group, the second lens group and the third lens group being sequentially arranged in a direction in which beams travel from the enlargement side toward the reduction side, wherein a number of lenses of the first lens group and a number of lenses of the third lens group are equal to each other, an arrangement of lens power of the plurality of lenses of the first lens group, which are arranged from the enlargement side toward the reduction side, is the same as an arrangement of lens power of the plurality of lenses of the third lens group, which are arranged from the reduction side toward the enlargement side, enlargement-side and reduction-side portions of the relay system are telecentric portions, the first lens group includes two positive lenses and a cemented unit lens sequentially arranged from the enlargement side toward the reduction side, and the third lens group includes two positive lenses and a cemented unit lens sequentially arranged from the reduction side toward the enlargement side.

2. The relay system according to claim 1, wherein out of the lenses of the first, second, and third lens groups, a lens having a smallest effective diameter has aspheric surfaces.

3. The relay system according to claim 1, wherein the second lens group is formed of the diaphragm and the single negative lens.

4. The relay system according to claim 1, wherein the relay system satisfies conditional expressions below, $$D1 < L1$$

$$D2 < L2$$

where L1 represents a largest air spacing, D1 represents a smaller effective diameter of a lens or an image formation plane adjacent to the largest air spacing, that is, either an effective diameter of the lens or an effective diameter of one of the enlargement-side and reduction-side image formation planes, L2 represents a second largest air spacing, and D2 represents a smaller effective diameter of a lens or an image formation plane adjacent to the second largest air spacing, that is, either the effective diameter of the lens or the effective diameter of another one of the enlargement-side and reduction-side image formation planes.

5. The relay system according to claim 1, wherein the relay system satisfies conditional expressions below, $$D1 < L1$$

$$D2 < L2$$

where L1 represents a largest air spacing, D1 represents a smaller effective diameter of a lens or an image formation plane adjacent to the largest air spacing, that is, either an effective diameter of the lens or an effective diameter of one of the enlargement-side and reduction-side image formation planes, L2 represents a second largest air spacing, and D2 represents a smaller effective diameter of two lenses, that is, the effective diameter of a lens adjacent to the second largest air spacing.

6. The relay system according to claim 4, further comprising:

a first planar mirror disposed in the largest air spacing; and a second planar mirror disposed in the second-largest air spacing, wherein the largest air spacing is provided between the enlargement-side image formation plane and the first lens group, and the second-largest air spacing is provided between the third lens group and the reduction-side image formation plane.

7. The relay system according to claim 5, further comprising:

a first planar mirror disposed in the largest air spacing, and a second planar mirror disposed in the second-largest air spacing, wherein the largest air spacing is provided between the enlargement-side image formation plane and the first lens group, and the second-largest air spacing is provided in the first lens group.

8. The relay system according to claim 6, wherein the first and second planar mirrors each deflect beams, an optical axis of the enlargement-side image formation plane and an optical axis of the reduction-side image formation plane are parallel to each other, and a direction in which the beams are incident on the enlargement-side image formation plane is opposite a direction in which the beams are incident on the reduction-side image formation plane.

9. A projector comprising:

a relay system that couples an enlargement-side image formation plane at an enlargement side to a reduction-side image formation plane at a reduction side, the reduction-side image formation plane being a reduced version of the enlargement-side image formation plane, the relay system comprising:

a first lens group formed of a plurality of lenses and having positive power; a second lens group including a diaphragm and at least one negative lens and having negative power; and a third lens group formed of a plurality of lenses and having positive power, the first lens group, the second lens group and the third lens group being sequentially arranged in a direction in which beams travel from the enlargement side toward the reduction side, wherein a number of lenses of the first lens group and a number of lenses of the third lens group are equal to each other, an arrangement of lens power of the plurality of lenses of the first lens group, which are arranged from the enlargement side toward the reduction side, is the same as an arrangement of lens power of the plurality of lenses of the third lens group, which are arranged from the reduction side toward the enlargement side, and enlargement-side and reduction-side portions of the relay system are telecentric portions;

a light source;

a color separation system that separates white light output from the light source into first color light having a first wavelength band containing blue light and other color light having a wavelength band longer than the first wavelength band;

a first light modulator that modulates the first color light separated by the color separation system;

a second light modulator that modulates the other color light separated by the color separation system;

the relay system, in which the first light modulator is disposed at the enlargement-side image formation plane and which reduces a luminous flux width of the first color light modulated by the first light modulator to a size of the reduction-side image formation plane;

a light combining prism that combines the first color light the luminous flux width of which is reduced by the relay system and the other color light modulated by the second light modulator with each other into combined light and outputs the combined light; and a projection system that projects the combined light output from the light combining prism, wherein an effective area of the first light modulator is larger than an effective area of the second light modulator, the relay system includes a first planar mirror disposed between the enlargement-side image formation plane and the first lens group, and a second planar mirror disposed between the third lens group and the reduction-side image formation plane, the first and second planar mirrors each deflect the beams, an optical axis of the enlargement-side image formation plane and an optical axis of the reduction-side image formation plane are parallel to each other, and a direction in which the first color light is incident on the enlargement-side image formation plane is opposite a direction in which the first color light exits via the reduction-side image formation plane.

10. A projector comprising:

a relay system that couples an enlargement-side image formation plane at an enlargement side to a reduction-side image formation plane at a reduction side, the reduction-side image formation plane being a reduced version of the enlargement-side image formation plane, the relay system comprising:

a first lens group formed of a plurality of lenses and having positive power; a second lens group including a diaphragm and at least one negative lens and having negative power; and a third lens group formed of a plurality of lenses and having positive power, the first lens group, the second lens group and the third lens group being sequentially arranged in a direction in which beams travel from the enlargement side toward the reduction side, wherein a number of lenses of the first lens group and a number of lenses of the third lens group are equal to each other, an arrangement of lens power of the plurality of lenses of the first lens group, which are arranged from the enlargement side toward the reduction side, is the same as an arrangement of lens power of the plurality of lenses of the third lens group, which are arranged from the reduction side toward the enlargement side, and enlargement-side and reduction-side portions of the relay system are telecentric portions;

a light source;

a color separation system that separates white light output from the light source into first color light having a first wavelength band containing blue light and other color light having a wavelength band longer than the first wavelength band;

a first light modulator that modulates the first color light separated by the color separation system;

35 a second light modulator that modulates the other color light separated by the color separation system;

the relay system, in which the first light modulator is disposed at the enlargement-side image formation plane and which reduces a luminous flux width of the first color light modulated by the first light modulator to a size of the reduction-side image formation plane;

a light combining prism that combines the first color light the luminous flux width of which is reduced by the relay system and the other color light modulated by the second light modulator with each other into combined light and outputs the combined light; and a projection system that projects the combined light output from the light combining prism, wherein an effective area of the first light modulator is larger than an effective area of the second light modulator, the relay system includes a first planar mirror disposed between the enlargement-side image formation plane and the first lens group, and a second planar mirror disposed in the first lens group, the first and second planar mirrors each deflect the beams, an optical axis of the enlargement-side image formation plane and an optical axis of the reduction-side image formation plane are parallel to each other, and a direction in which the first color light is incident on the enlargement-side image formation plane is opposite a direction in which the first color light exits via the reduction-side image formation plane.

\*    \*    \*    \*    \*